United States Patent
Yasue

(10) Patent No.: US 10,318,568 B2
(45) Date of Patent: Jun. 11, 2019

(54) GENERATION OF CLASSIFICATION DATA USED FOR CLASSIFYING DOCUMENTS

(71) Applicant: INTERNATIONAL BUSINESS MACHINES CORPORATION, Armonk, NY (US)

(72) Inventor: Toshiaki Yasue, Kanagawa-ken (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 135 days.

(21) Appl. No.: 15/175,744

(22) Filed: Jun. 7, 2016

(65) Prior Publication Data

US 2017/0351688 A1    Dec. 7, 2017

(51) Int. Cl.
G06F 17/30 (2006.01)
G06F 16/35 (2019.01)
G06F 17/24 (2006.01)
G06F 17/27 (2006.01)

(52) U.S. Cl.
CPC .......... *G06F 16/355* (2019.01); *G06F 17/246* (2013.01); *G06F 17/2745* (2013.01)

(58) Field of Classification Search
CPC ...... G06F 17/30; G06F 17/3071; G06F 17/00; G06F 16/355; G06F 17/246; G06F 17/2745
USPC ................................................. 707/600–899
See application file for complete search history.

(56) References Cited

U.S. PATENT DOCUMENTS

| | | | |
|---|---|---|---|
| 7,499,923 B2 | 3/2009 | Kawatani | |
| 7,971,150 B2 | 6/2011 | Raskutti et al. | |
| 8,462,394 B2 | 6/2013 | Fan et al. | |
| 2011/0153647 A1* | 6/2011 | Hoellwarth | G06F 17/30917 707/769 |
| 2013/0117268 A1 | 5/2013 | Smith et al. | |
| 2014/0280167 A1 | 9/2014 | Ghessassi | |
| 2016/0210426 A1 | 7/2016 | Robinson et al. | |

* cited by examiner

*Primary Examiner* — Isaac M Woo
(74) *Attorney, Agent, or Firm* — Tutunjian & Bitetto, P.C.; Vazken Alexanian

(57) ABSTRACT

Systems and methods are provided for generating classification data which is used for classifying documents. The method includes reading documents in a form of a spreadsheet; collecting cell values in each of the documents; finding one or more common cell values among the collected values; counting, for each of the common cell values, a number of the documents having the common cell value; storing, if the number of the documents is equal to or larger than a predetermined number, the common cell value as a candidate header label in a memory; calculating a distance between cell locations of the candidate header labels in each of the documents; choosing, according to the calculated distance, two or more candidate header labels among the candidate header labels for each of the documents; and storing one or more combinations of the chosen two or more candidate header labels as the classification data.

20 Claims, 17 Drawing Sheets

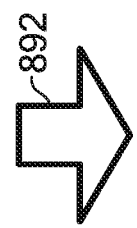

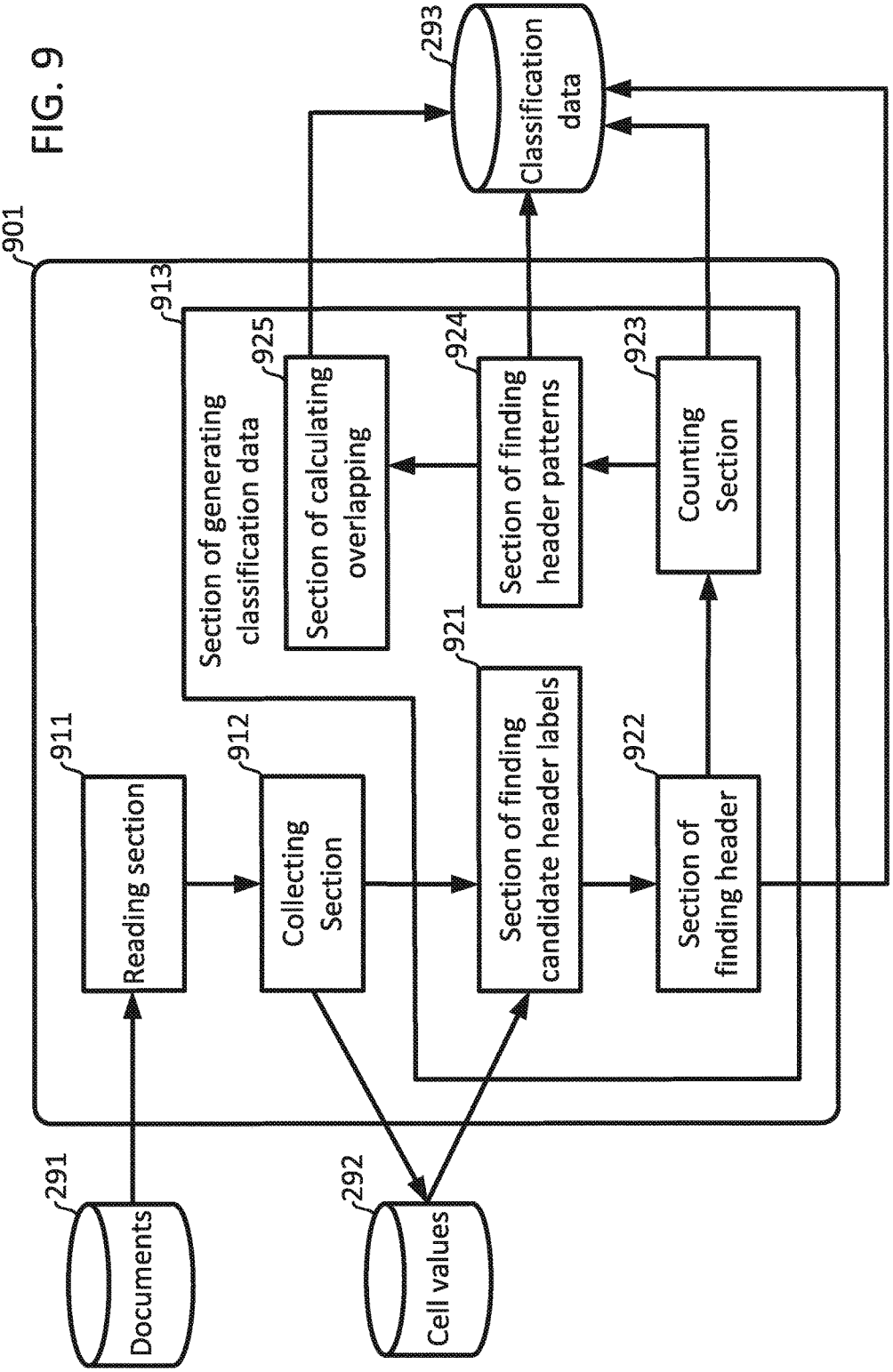

GENERATION OF CLASSIFICATION DATA USED FOR CLASSIFYING DOCUMENTS

BACKGROUND

Technical Field

This invention generally relates to a document clustering and, more specifically, to a technique for generating classification data which is used for classifying documents.

Description of the Related Art

It is important to improve the ability to work with large numbers of existing design documents of a system, and to determine which documents were developed by other vendors, for inventory, and for classification when the system is taken over. However, it often happens that there are no guide and template samples for the design documents taken over.

Since vendors have their own formats of design documents, and since the formats are often modified for each project, no common formats are, in general, used in different projects. Therefore, it is useful to automatically capture their formats and classify them based on the format.

For example, documents in a form of a spreadsheet are widely used for design documents.

SUMMARY

According to one aspect of the present invention, an embodiment of the present invention provides a computer-implemented method for generating classification data which is used for classifying documents. The method comprises reading, in a memory, documents in a form of a spreadsheet and collecting cell values in each of the documents; finding, in each of common or near cell locations among all or a part of the documents, one or more common cell values among the collected values, counting, for each of the common cell values, the number of the documents having the common cell value and, if the number of the documents is equal to or larger than a predetermined number, storing the common cell value as a candidate header label in a memory; and calculating a distance between cell locations of the candidate header labels in each of the document, choosing, with closeness of the distance, two or more candidate header labels among the candidate header labels for each of the documents, and storing one or more combinations of the chosen two or more candidate header labels (hereinafter referred to as "header") as the classification data in a storage.

According to another aspect of the present invention, a system such as a computer system comprising a computer readable storage medium storing a program of instructions executable by the system to perform one or more methods described herein may be provided.

According to another aspect of the present invention, a computer program product comprising a computer readable storage medium storing a program of instructions executable by the system to perform one or more methods described herein also may be provided.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein:

FIG. 8E illustrates an embodiment of classifying documents with classification data which was generated in the embodiment described in FIGS. 8A to 8D, according to an embodiment of the present principles.

FIG. 9 illustrates an embodiment of an overall functional block diagram of computer system hardware used in accordance with the embodiment of the overall flowchart described in FIG. 2A, according to an embodiment of the present principles.

Throughout the drawings, same or similar reference numerals represent the same or similar elements.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term, "a document in a form of a spreadsheet", may also refer to as "a document having a spreadsheet style". The document in a form of a spreadsheet may be a spreadsheet document: such as a calculation software sheet or a calculation software book having plural sheets; or a word processor, presentation or graphic document in which one or more spreadsheets are embedded. An example of the calculation software sheet or a calculation software sheet in a book may be an Excel® sheet. An example of the spreadsheet embedded in a word processor, presentation or graphic document may be an Excel® sheet embedded in Word®, PowerPoint® or Visio® document.

The term, "header label", may refer to cell value in each document. Cell value can be value displayed on a screen or value calculated based on actual value of a cell.

The term, "header", may refer to a combination of two or more header labels. A header may be located as precedence of main content in a document in a form of a spreadsheet. The header can be used as classification data which is used for classifying documents.

The term, "header pattern", may refer to a combination of two or more headers. The header pattern can be used as classification data which is used for classifying documents.

Figure 1:
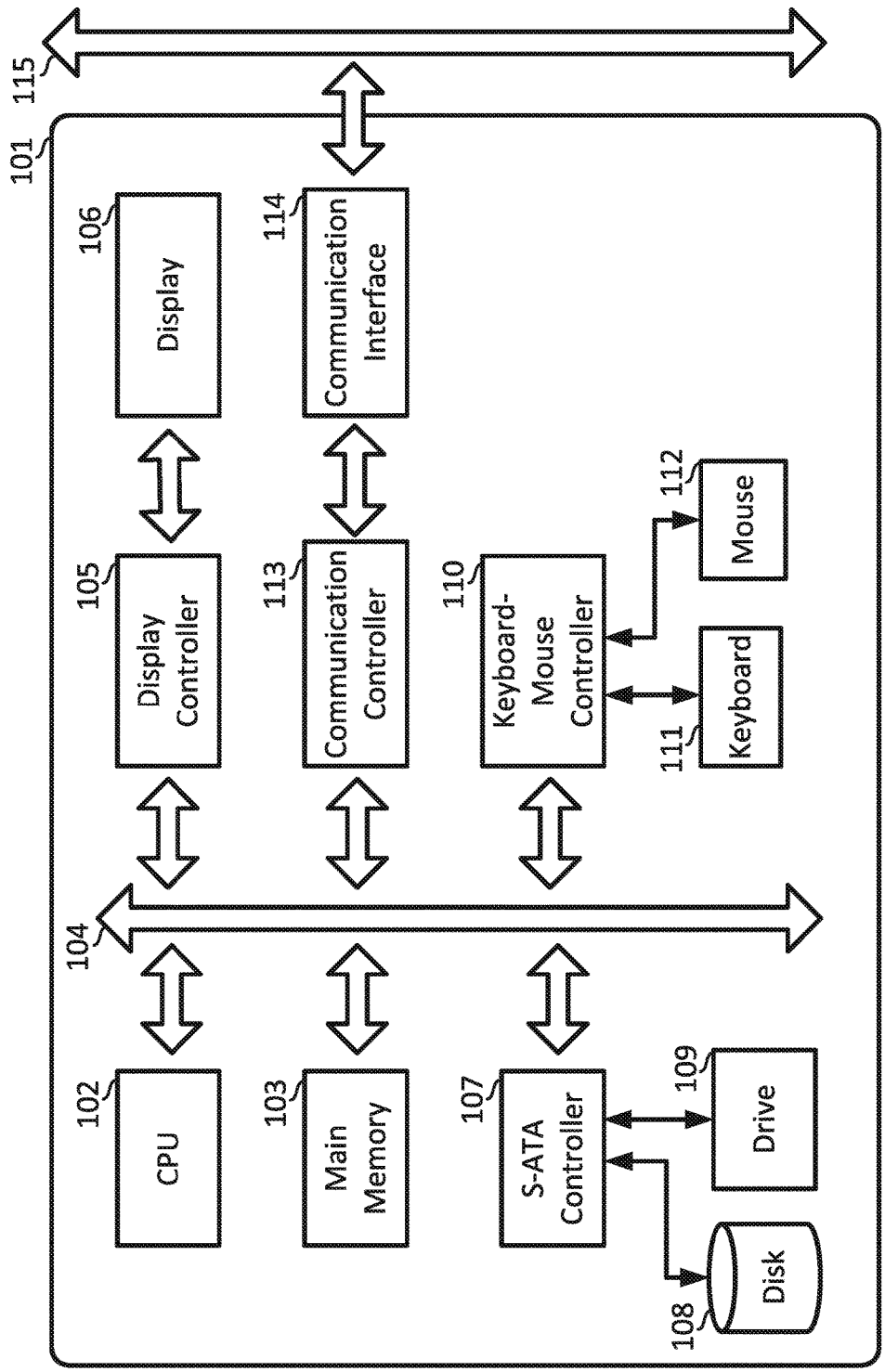
FIG. 1 illustrates an exemplified basic block diagram of a device used in an embodiment of the present invention.

With reference now to FIG. 1, FIG. 1 illustrates an exemplified basic block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a regis-tered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, an embodiment of the present invention will be described with reference to the following FIGS. 2A, 3, 4, 5A and 5B, 6, 7A and 7C, 8A to 8D and 9.

FIGS. 2A, 3, 4, 5A and 5B, 6, 7A and 7C illustrates an embodiment of flowchart of a process for generating classification data which is used for classifying documents.

Figure 2A:
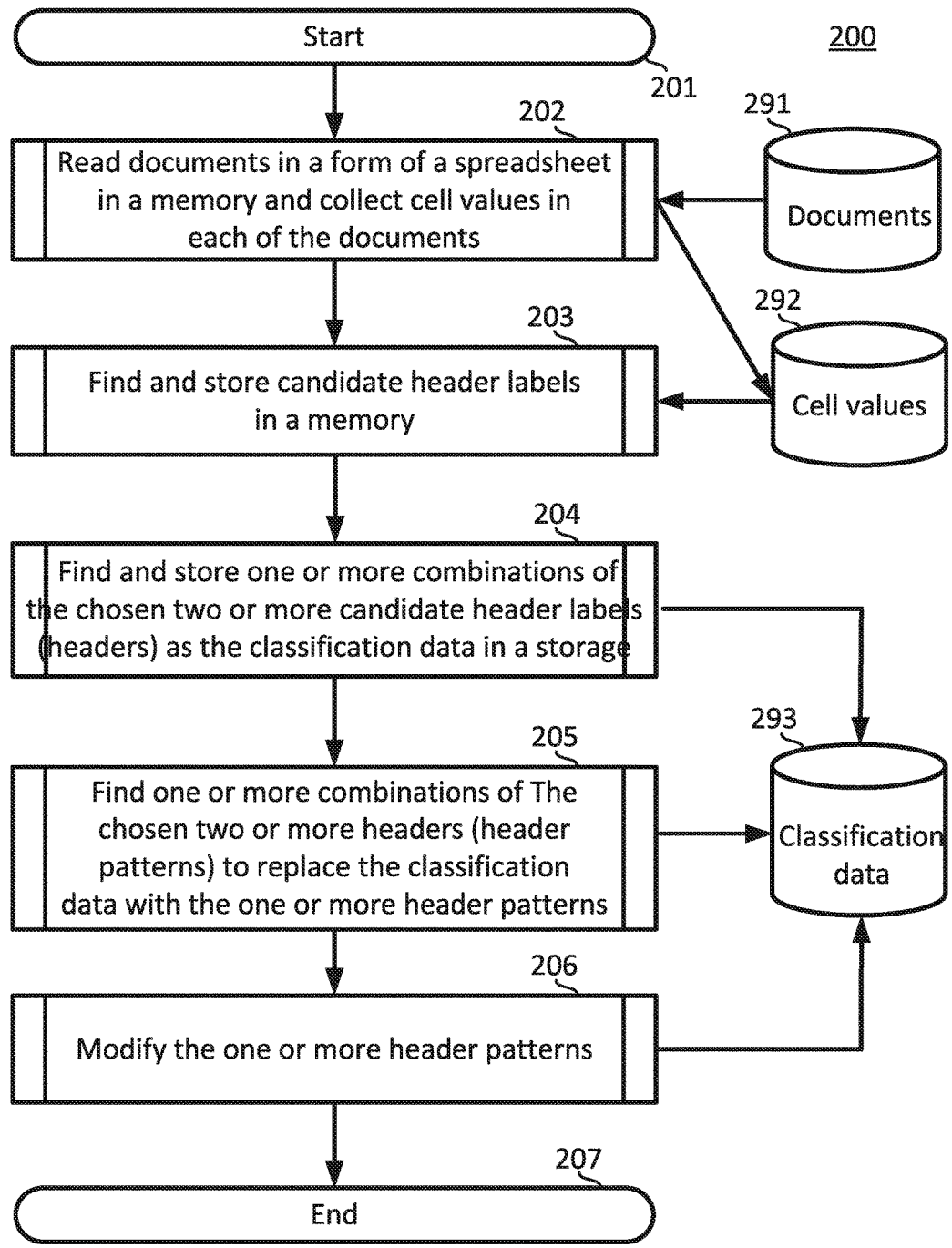
FIG. 2A illustrates an embodiment of an overall flowchart of a process for generating classification data which is used for classifying documents, according to an embodiment of the present principles.
Figure 2B:
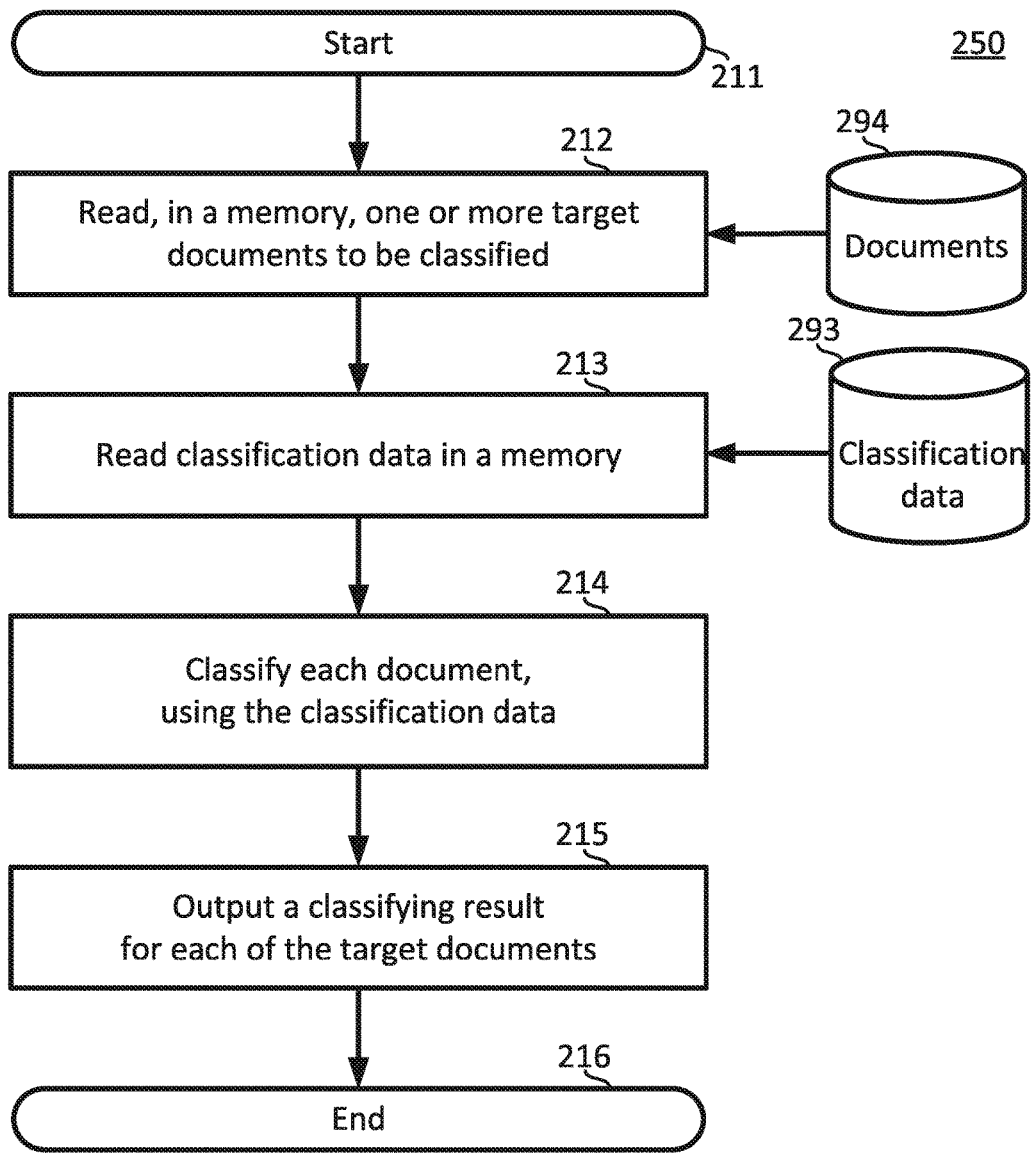
FIG. 2B illustrates an embodiment of an overall flowchart of a process for classifying documents with classification data which was generated in the process described in FIG. 2A, according to an embodiment of the present principles.

FIG. 2B illustrates an embodiment of an overall flowchart of a process for classifying documents with classification data which was generated in the process described in FIGS. 2A, 3, 4, 5A and 5B, 6, 7A and 7C.

With reference now to FIG. 2A, FIG. 2A illustrates an embodiment of an overall flowchart of a process 200 for generating classification data which is used for classifying documents.

A system such as the computer (101) performs each process described in FIG. 2A. The system may be implemented as a single computer or plural computers.

Let us suppose that a storage (291) stores plural documents in a form of a spread sheet. The storage (291) may be a storage embedded in the system or a storage connected to the system via an intranet or internet, such as a network attached storage, i.e. NAS.

In step 201, the system starts the process 200 mentioned above.

In step 202, the system reads documents in a form of a spread sheet from the storage (291) and then stores them in a memory.

After then, the system collects cell values in each of the documents and then stores the collected cell values in a repository (292). When a document has plural spread sheet, the system collects cell values in each of the sheet.

The system may replace a space character in each cell with any symbol character, for example, but not limited to, "_".

The system may ignore the case of characters, for example, by unifying characters in the cell values with either big or small letters. Further, the system may fix a misspelled or missing word(s) in the cell values.

The repository (292) may be a repository used analysis or a data base. The repository used for analysis may be implemented as, for example, but not limited to, Lucene repository which is an indexing and search library. The Lucene repository may be an Apache Lucene repository. The data base may be any database known in the art.

The details of step 202 will be explained below by referring to FIG. 3.

In step 203, the system finds, in each of common or near cell locations among all or a part of the documents, one or more common cell values among the collected values stored in the repository (292); counts for each of the common cell values, the number of the documents having the common cell value; and, if the number of the documents is equal to or larger than a predetermined number, stores the common cell value as a candidate header label in a memory or in a storage (293).

The near cell locations may be cell locations in a row, cell locations in a column, or cell locations in any row and column.

The details of step 203 will be explained below by referring to FIG. 4.

In step 204, the system calculates a distance between cell locations of the candidate header labels in each of the documents; chooses, according to the distance, two or more candidate header labels among the candidate header labels for each of the documents to generate one or more combinations of the chosen two or more candidate header labels (hereinafter referred to as "a header"); if plural set of two or more candidate header labels can be chosen, repeats the choice of two or more candidate header labels among the candidate header labels for each of the documents; and stores one or more headers as the classification data in a storage (293).

The distance between cell locations may be a distance between cells in a row, or a distance between cells in a column, or a distance between cells in any row and column. The calculation of a distance between cell locations of the candidate header labels may be calculated by judging a relative position between possible cell locations of the candidate header labels in each of the document.

The details of step 204 will be explained below by referring to FIGS. 5A and 5B.

In an optional step 205, the system calculates similarity between or among the headers; chooses, based on the similarity, two or more headers among the headers in each of the documents to generate a combination of the chosen two or more headers (hereinafter referred to as "a header pattern"); if possible, repeats the choice of two or more headers among the headers in each of the documents; and replaces the classification data in the storage (293) with one or more header patterns.

The similarity between or among the headers can be calculated with, for example, but not limited to, cosign similarity or edit distance. Both of the cosign similarity and edit distance are known in the art.

For example, the headers between (modify date) and (modifying date) may be treated as the same value, using the edit distance.

The details of step 205 will be explained below by referring to FIG. 6.

In an optional step 206, the system modifies the one or more header patterns.

The system may find out an overlapping relation of headers between or among the header patterns. After finding out the overlapping relation, a part having the overlapping relation is set to new header pattern (hereinafter referred to as "a major header pattern") and a header pattern having the part is set to a derived header pattern for the major header part.

The system may further calculate a ratio of the number of documents in which the major header pattern is comprised and the number of documents in which the derived header pattern is comprised; and if the ratio is equal to or larger than a predetermined value, replace the derived header pattern with the major header pattern.

Let us suppose that headers "hdr1", "hdr2", "hdr3" and "hdr4" are found in ten documents and header patterns {"hdr1", "hdr2", "hdr3"} and {"hdr1", "hdr2", "hdr4"} are found in a combination of the headers which were detected in each document. Further, let us suppose that nine documents are found for the header pattern {"hdr1", "hdr2", "hdr3"} and two documents are found for header patterns {"hdr1", "hdr2", "hdr4"}. In this case, a part having the overlapping relation is {"hdr1", "hdr2"} and, therefore, the number of documents having the part is ten. For the header pattern {"hdr1", "hdr2", "hdr3"}, the number of documents having the {"hdr1", "hdr2"} is ten and the number of documents having the {"hdr1", "hdr2", "hdr3"} is eight and, therefore, a ratio of the number of documents having the {"hdr1", "hdr2"} and the number of documents having the {"hdr1", "hdr2", "hdr3"} is 1.25 (=10/8). If a predetermined value is five, the calculated ratio is lower than the predetermined value and, therefore, the header pattern { "hdr1", "hdr2", "hdr3"} is set to a derived header pattern for the overlapping part {"hdr1", "hdr2"}. Meanwhile, for the header pattern {"hdr1", "hdr2", "hdr4"}, the number of documents having the {"hdr1", "hdr2"} is ten and the number of documents having the {"hdr1", "hdr2", "hdr4"} is two and, therefore, a ratio of the number of documents having the {"hdr1", "hdr2"} and the number of documents having the {"hdr1", "hdr2", "hdr4"} is 5 (=10/2). If a predetermined value is five, the calculated ratio is larger than the predetermined value and, therefore, the header pattern {"hdr1", "hdr2", "hdr4"} is considered to be a minor modification of the {"hdr1", "hdr2"} and not a main header pattern. Therefore, the header pattern {"hdr1", "hdr2", "hdr4"} is removed and the header patterns {"hdr1", "hdr2"} and {"hdr1", "hdr2", "hdr3"} are effective. Accordingly, the documents having the header pattern {"hdr1", "hdr2", "hdr4"} is deemed to be the documents having the header pattern {"hdr1", "hdr2"}. As a result, the number of document having the header pattern {"hdr1", "hdr2", "hdr4"} is add to the number of documents having the header pattern {"hdr1", "hdr2"}.

The details of step 206 will be explained below by referring to FIGS. 7A to 7C.

In step 207, the system terminates the process mentioned above.

With reference now to FIG. 2B, FIG. 2B illustrates an embodiment of an overall flowchart of a process 250 for classifying documents with classification data which was generated in the process described in FIG. 2A.

A system such as the computer (101) performs each process described in FIG. 2B. The system may be implemented as a single computer or plural computers. The system used in FIG. 2B may be the same as or different from that used in FIG. 2A.

In step 211, the system starts the process 250 mentioned above.

In step 212, the system reads, from a storage (294), one or more target documents to be classified and then stores the target documents in a memory. The target documents may be the same as or different from those used in step 202 described in FIG. 2A.

In an optional step 213, the system reads the classification data from the storage (293) and then stores the classification data in the memory, if the system does not have the classification data in the memory.

In step 214, the system classifies each document, using the classification data.

In step 215, the system may output a classification result for each of the target documents. The classification result may be output via a display or printer connected to the system. Alternatively, the classification result may be output as a result file and then stored in a storage.

In step 216, the system terminates the process mentioned above.

The order of steps 212 and 213 can be interchangeable or parallel performed.

Figure 3:
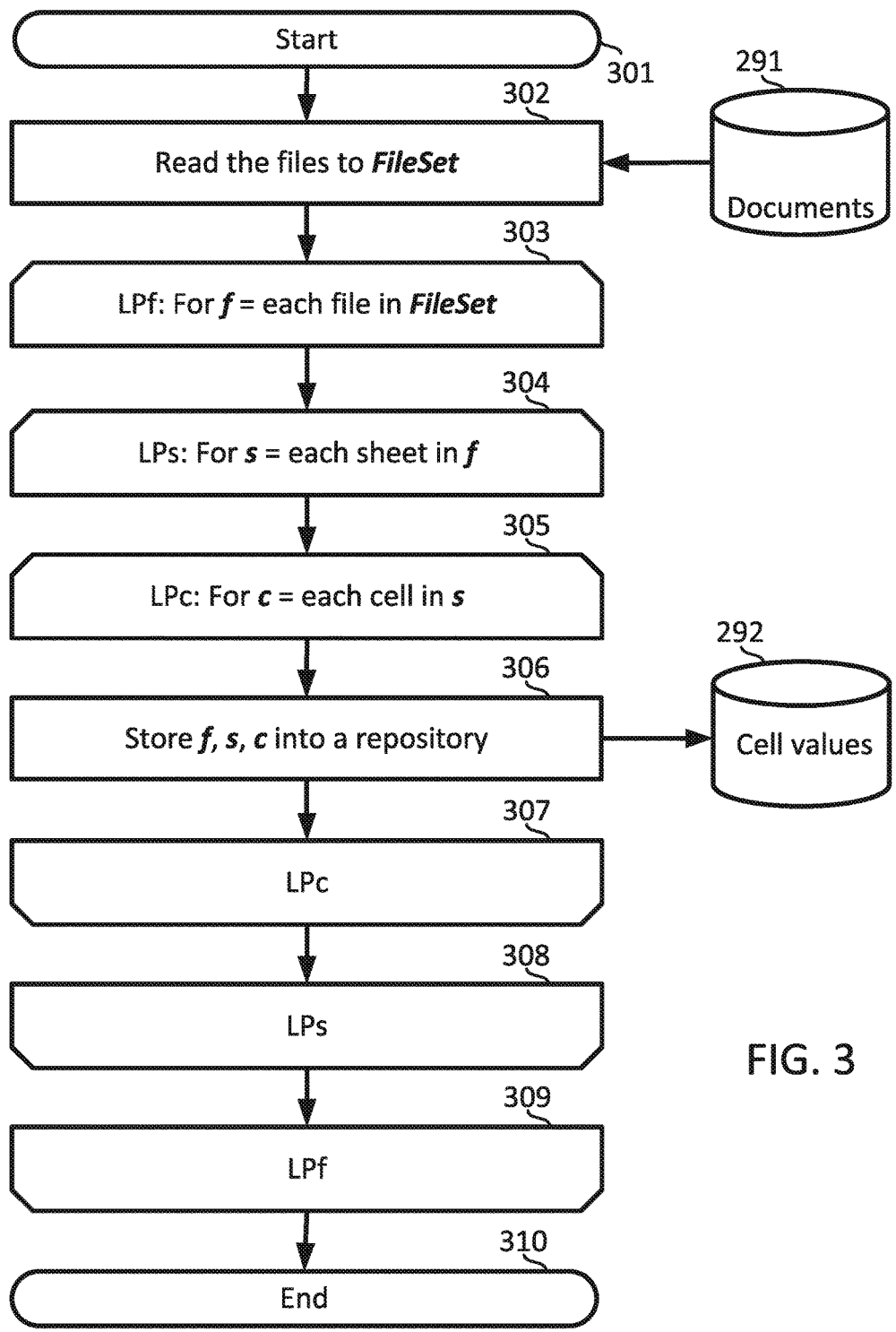
FIG. 3 illustrates an embodiment of a detailed flowchart of step 202 described in FIG. 2A, according to an embodiment of the present principles.

With reference now to FIG. 3, FIG. 3 illustrates an embodiment of a detailed flowchart of step 202 described in FIG. 2A.

In step 301, the system starts the process of the step 202 described in FIG. 2A.

In step 302, the system reads, from the storage (291), files to a variable, "FileSet". The files may have one or more documents in a form of a spread sheet. The document may be a spreadsheet (hereinafter also referred to as simply "sheet").

In step 303, the system prepares "LPf" in a memory, where "f" denotes each file in "FileSet".

In step 304, the system prepares "LPs" in the memory, where "s" denotes each sheet in "f".

In step 305, the system prepares "LPc" in the memory, where "c" denotes each cell in "s". The system may replace a space character in each cell with any symbol character, for example, but not limited to, "_".

In step 306, the system stores "f", "s", and "c" into the repository (292).

In step 307, the system repeats the steps 305 and 306 until unprocessed cell(s) in a sheet is(are) processed.

In step 308, the system repeats the steps 304 to 307 until unprocessed sheet(s) in a file is(are) processed.

In step 309, the system repeats the steps 303 to 308 until unprocessed file(s) is(are) processed.

In step 310, the system terminates the process of the step 202. As a result of the flowchart of step 202, cell values in each sheet of each file are obtained.

Figure 4:
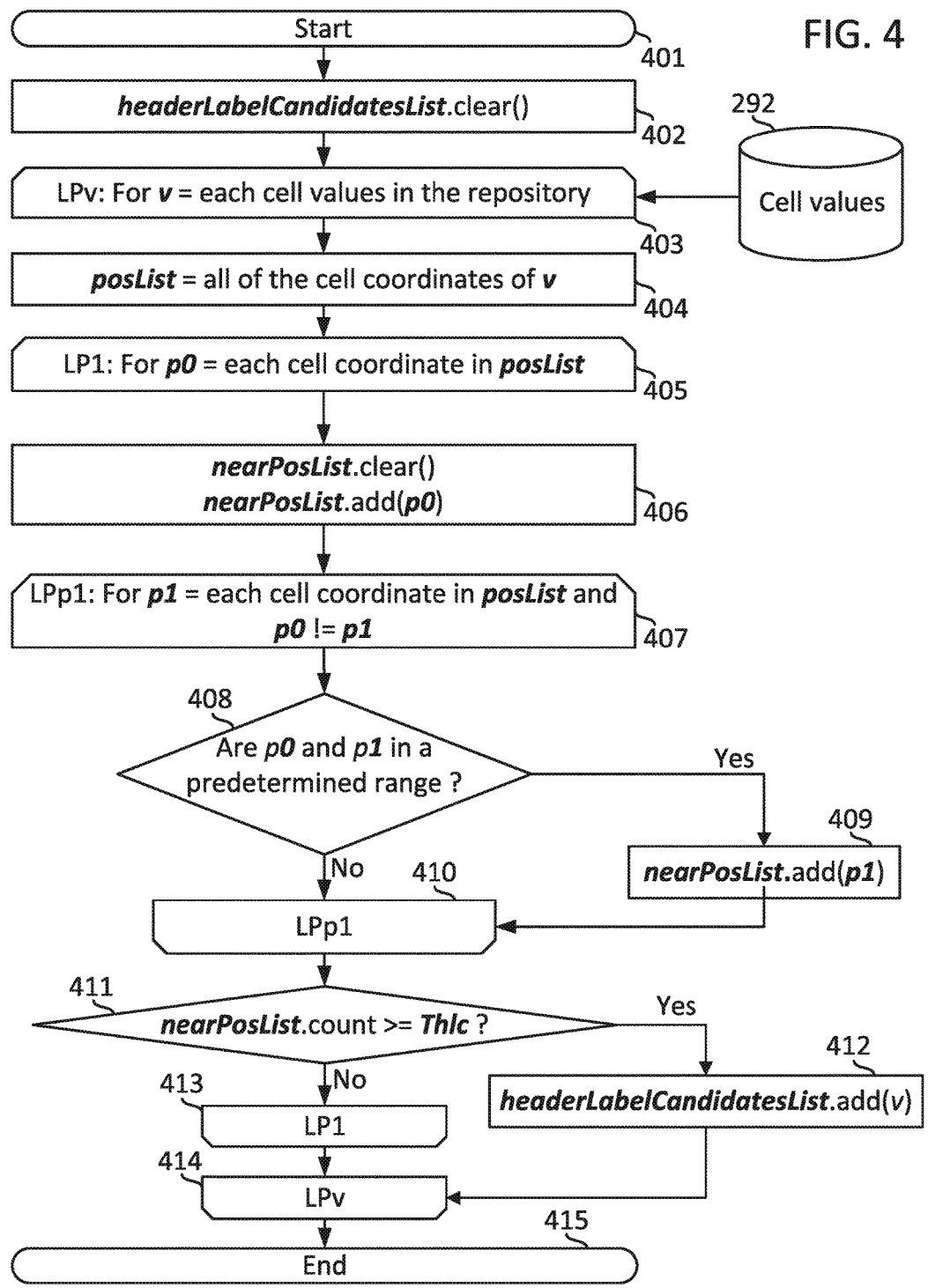
FIG. 4 illustrates an embodiment of a detailed flowchart of step 203 described in FIG. 2A, according to an embodiment of the present principles.

With reference now to FIG. 4, FIG. 4 illustrates an embodiment of a detailed flowchart of step 203 described in FIG. 2A.

In step 401, the system starts the process of the step 203 described in FIG. 2A.

In step 402, the system prepares a variable, "headerLabelCandidatesList", in a memory and then initializes the variable by zero. The variable, "headerLabelCandidatesList", is a memory place where a list of candidate header labels is stored.

In step 403, the system prepares "LPv" in the memory, where "v" denotes each cell values in the repository (292).

In step 404, the system prepares, in the memory, "posList", where "posList" is all of the cell coordinates of "v".

In step 405, the system prepares, in the memory, "LP1", where "p0" denotes each cell coordinates in "posList".

In step 406, the system prepares a variable, "nearPosList", in the memory and then initializes the variable by zero. After then, the system further adds p0 to "nearPosList". The variable, "nearPosList", is a memory place where a list of "p1"(s) is stored.

In step 407, the system prepares "LPp1" in the memory, where "p1" denotes each cell coordinate in posList and p0 !=p1.

In step 408, the system judges whether "p0" and "p1" are in a predetermined range or not. The predetermined range may be a range between cells in a row, or a range between cells in a column, or a range between cells in any row and column. For example, the predetermined range may be judges by abs(p0.X−p1.X)<=TnearX and abs(p0.Y−p1.Y) <=TnearY, where X denotes a longitudinal distance and Y denotes a vertical distance. If the judgment is positive, the system proceeds to step 409. Meanwhile, if the judgment is negative, the system proceeds to step 410.

In step 409, the system adds "p1" to "nearPosList".

In step 410, the system repeats the steps 407 to 409 until unprocessed "p1" is (are) processed.

In step 411, the system counts "nearPosList" and then judges whether the counted number is equal to or larger than a predetermined number. The predetermined number can be determined by a user. If the judgment is positive, the system proceeds to step 412. Meanwhile, if the judgment is negative, the system proceeds to step 413.

In step 412, the system adds v to "headerLabelCandidatesList".

In step 413, the system repeats the steps 405 to 412 until unprocessed "p0" is(are) processed.

In step 414, the system repeats the steps 403 to 413 until unprocessed "v" is(are) processed.

In step 415, the system terminates the process of the step 203. As a result of the flowchart of step 203, candidate header labels are obtained.

Figure 5A:
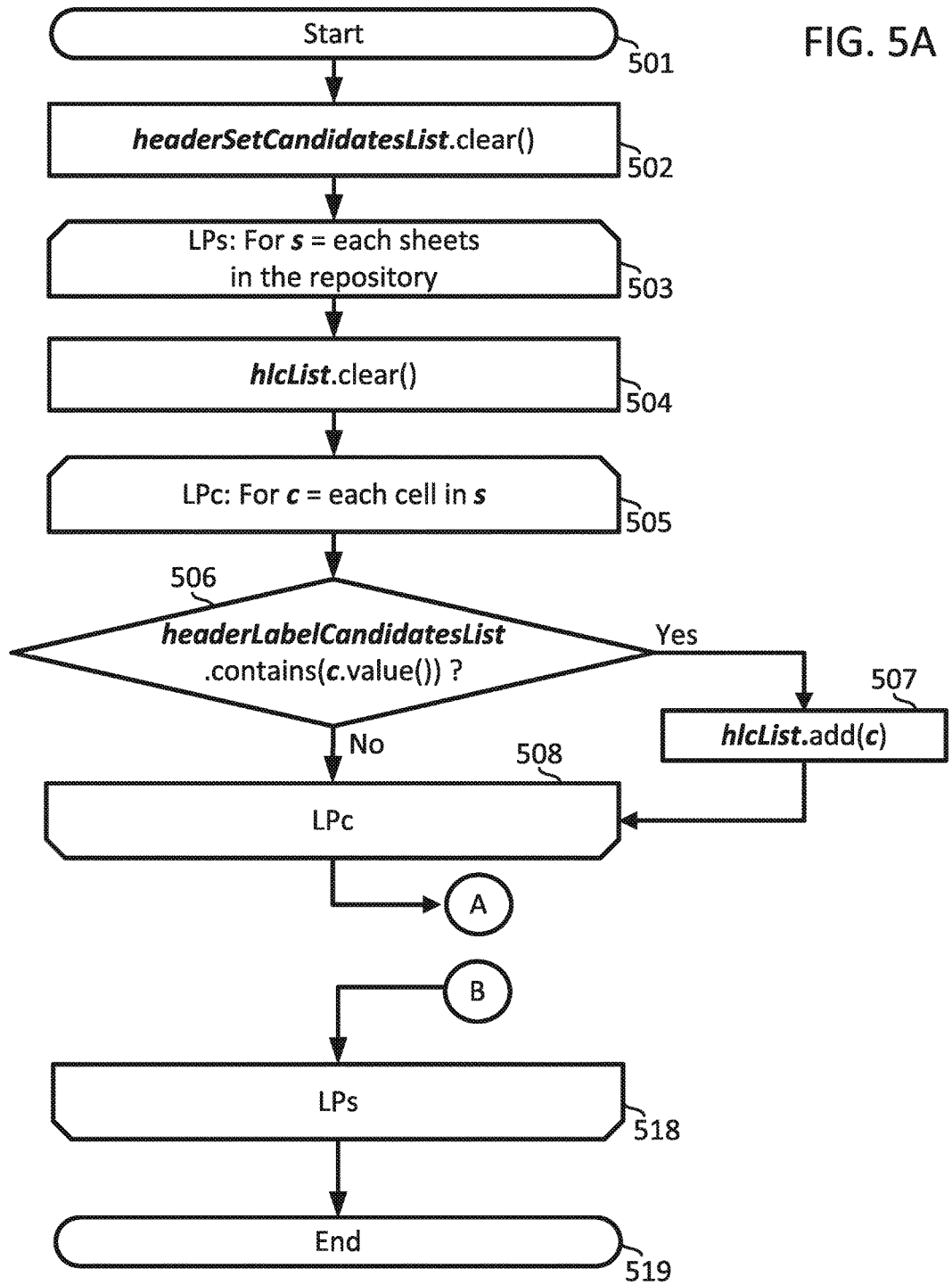
FIGS. 5A and 5B illustrate an embodiment of a detailed flowchart of step 204 described in FIG. 2A, according to an embodiment of the present principles.
Figure 5B:
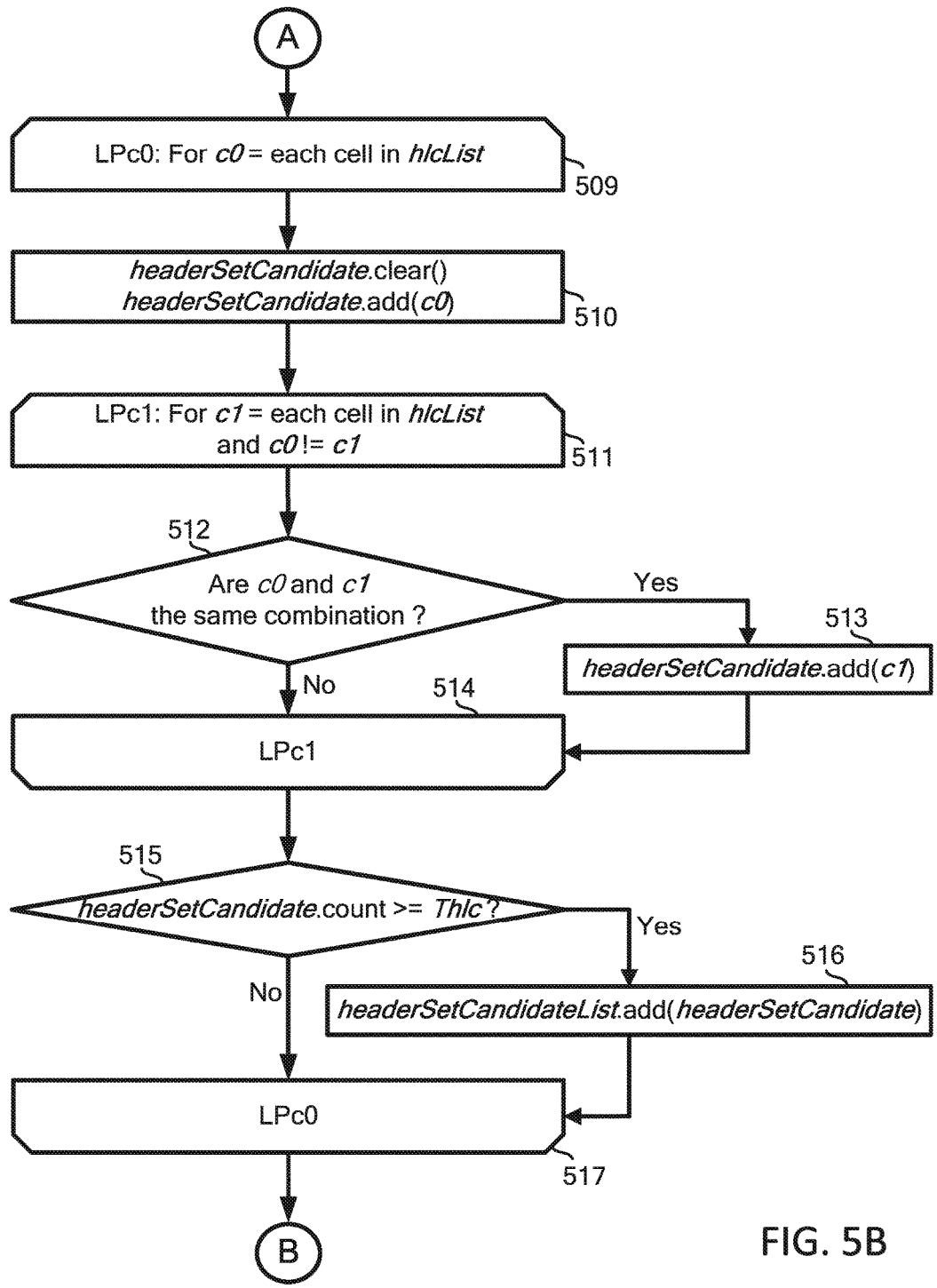

With reference now to FIGS. 5A and 5B, FIGS. 5A and 5B illustrate an embodiment of a detailed flowchart of step 204 described in FIG. 2A.

In step 501, the system starts the process of the step 204 described in FIG. 2A.

In step 502, the system prepares a variable, "headerSetCandidatesList", in a memory and then initializes the variable by zero. The variable, "headerSetCandidatesList", is a memory place where a list of one or more candidate headers, combinations of candidate header labels, is stored.

In step 503, the system prepares "LPs" in the memory, where "s" denotes each sheets in the repository.

In step 504, the system prepares a variable, "hlcList", in the memory and then initializes the variable by zero. The variable, "hlcList", is a memory place where a list of candidate header label(s) which exist(s) in sheet "s" is stored.

In step 505, the system prepares "LPc" in the memory, where "c" denotes each cell in "s".

In step 506, the system judges whether "headerLabelCandidatesList" contains c.value ( ). If the judgment is positive, the system proceeds to step 507. Meanwhile, if the judgment is negative, the system proceeds to step 508.

In step 507, the system adds c to "hlcList".

In step 508, the system repeats the steps 505 to 507 until unprocessed cell(s) in a sheet is(are) processed.

In step 509, the system prepares "LPc0" in the memory, where "c0" denotes each cell in "hlcList".

In step 510, the system prepares a variable, "headerSetCandidate", in the memory and then initializes the variable by zero. After then, the system further adds "c0" to "headerSetCandidate". The variable, "headerSetCandidate", is a memory place where a list of header label(s) which exist(s)

adjacent to a header label "c0", that is a header label candidate comprising a header label "c0".

In step 511, the system prepares "LPc1" in the memory, where "c1" denotes each cell in "hlcList" and c0 !=c1.

In step 512, the system judges whether "c0" and "c1" are the same combination or not. For example, "c0" and "c1" have the relation, c0.Y=c1.Y, or c0.X=c1.X, where X denotes a longitudinal distance and Y denotes a vertical distance. If the judgment is positive, the system proceeds to step 513. Meanwhile, if the judgment is negative, the system proceeds to step 514.

In step 513, the system adds "c1" to "headerSetCandidate".

In step 514, the system repeats the steps 511 and 513 until unprocessed cell(s), c1, in "hlcList" is (are) processed.

In step 515, the system counts "headerSetCandidate" and then judges whether the counted number is equal to or larger than a predetermined number. The predetermined number can be determined by a user. If the judgment is positive, the system proceeds to step 516. Meanwhile, if the judgment is negative, the system proceeds to step 517.

In step 516, the system adds "headerSetCandidate" to "headerSetCandidateList".

In step 517, the system repeats the steps 509 to 516 until unprocessed cell(s), "c0", in "hlcList" is (are) processed.

In step 518, the system repeats the steps 503 and 517 until unprocessed sheet(s) in the repository is (are) processed.

In step 519, the system terminates the process of the step 204. As a result of the flowchart of step 204, one or more combinations of the chosen two or more candidate header labels, i.e. one or more headers, are obtained. Each header can be used as classification data which is used for classifying documents.

Figure 6:
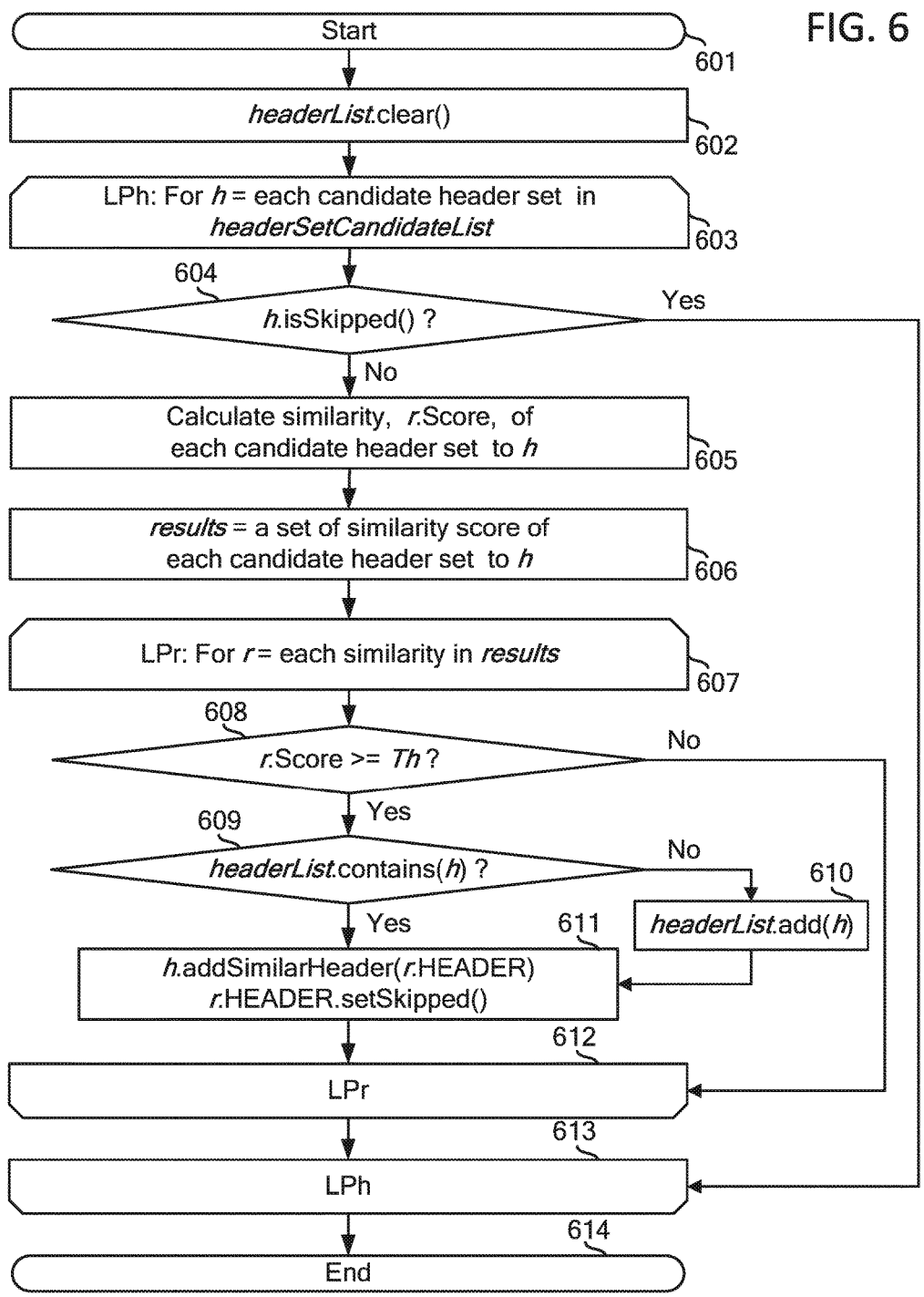
FIG. 6 illustrates an embodiment of a detailed flowchart of step 205 described in FIG. 2A, according to an embodiment of the present principles.

With reference now to FIG. 6, FIG. 6 illustrates an embodiment of a detailed flowchart of step 205 described in FIG. 2A.

In step 601, the system starts the process of the step 205 described in FIG. 2A.

In step 602, the system prepares a variable, "headerList", in the memory and then initializes the variable by zero. The variable, "headerList", is a memory place where a list of one or more combinations of the headers is stored.

In step 603, the system prepares "LPh", where "h" denotes each candidate header set in "headerSetCandidate".

In step 604, the system judges whether "h" has been already processed as a similar header of the other headers. If the judgment is positive, the system proceeds to step 613 in order to skip the following steps 605 to 612. Meanwhile, if the judgment is negative, the system proceeds to step 605.

In step 605, the system calculates similarity, "r.score", of each candidate header set to "h".

In step 606, the system prepares "results", where "results" denotes a set of similarity score of each candidate header set to "h".

In step 607, the system prepares "LPr", where "r" denotes a calculation result of the similarity of all other header candidates to "h" and has two values, the corresponding header "r.HEADER" and the similarity "r.score", therein.

In step 608, the system judges whether the similarity score of r is equal to or larger than a predetermined number. If the judgment is negative, the system proceeds to step 612. Meanwhile, if the judgment is positive, the system proceeds to step 609.

In step 609, the system judges whether the system judges whether "headerList" contains "h" or not. If the judgment is negative, the system proceeds to step 610. Meanwhile, if the judgment is positive, the system proceeds to step 611.

In step 610, the system adds "h" to "headerList".

In step 611, the system registers, as a similar header, a header, "r.HEADER" which was judged to be similar to "h", by adding "h.addSimilarHeader(r.HEADER)". Further, the system sets "r.HEADER" to "Skipped ( )" in order to be judged "Skipped ( )" in the step 604 above.

In step 612, the system repeats the steps 607 to 611 until unprocessed similarity (ies) in results is(are) processed.

In step 613, the system repeats the steps 603 to 612 until unprocessed candidate headerset(s) is (are) processed.

In step 614, the system terminates the process of the step 205. As a result of the flowchart of step 204, one or more combinations of the chosen two or more headers, i.e. one or more header pattern, are obtained. Each header pattern can be used as classification data which is used for classifying documents.

Figure 7A:
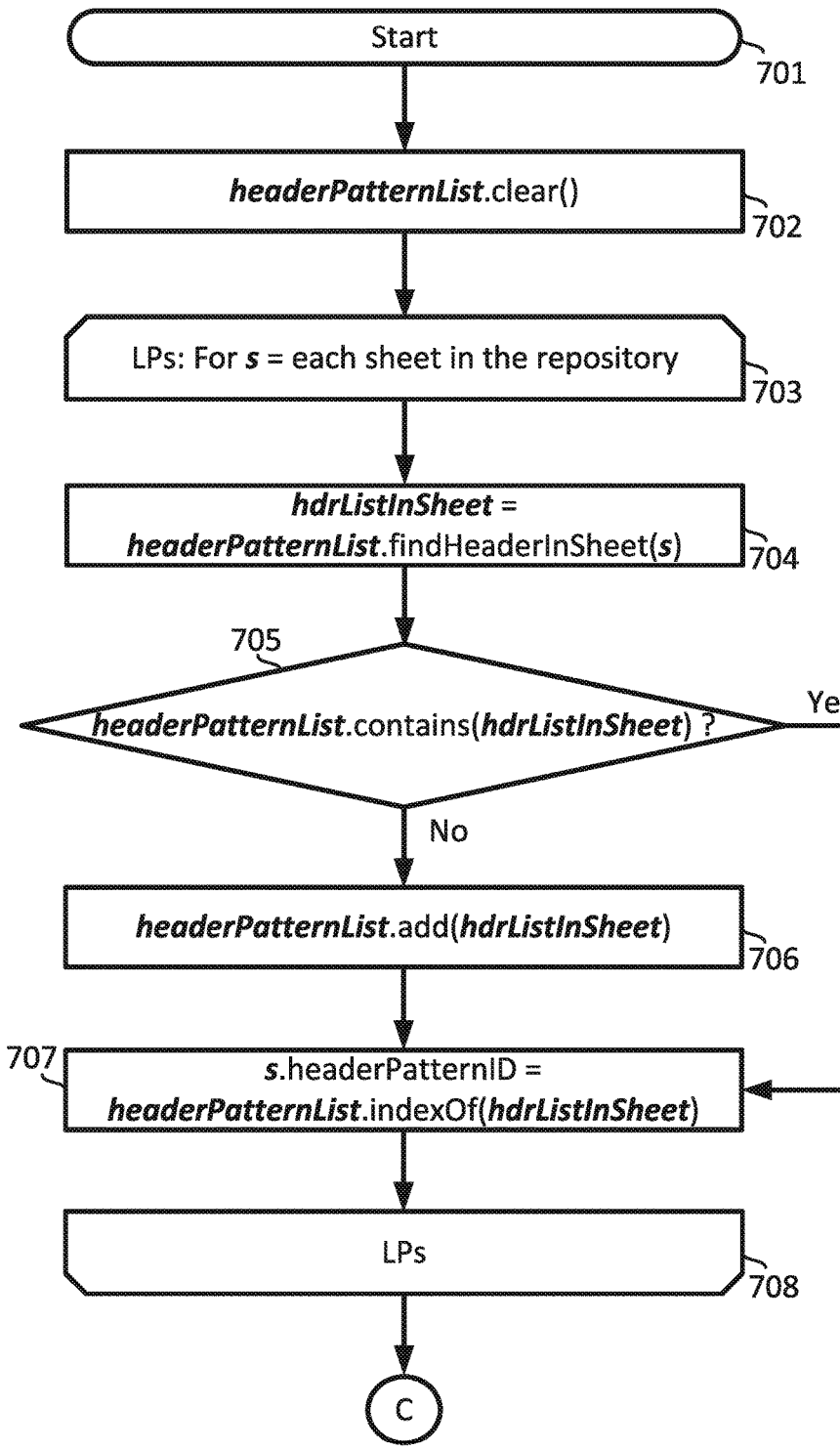
FIGS. 7A to 7C illustrate an embodiment of a detailed flowchart of step 206 described in FIG. 2A, according to an embodiment of the present principles.
Figure 7B:
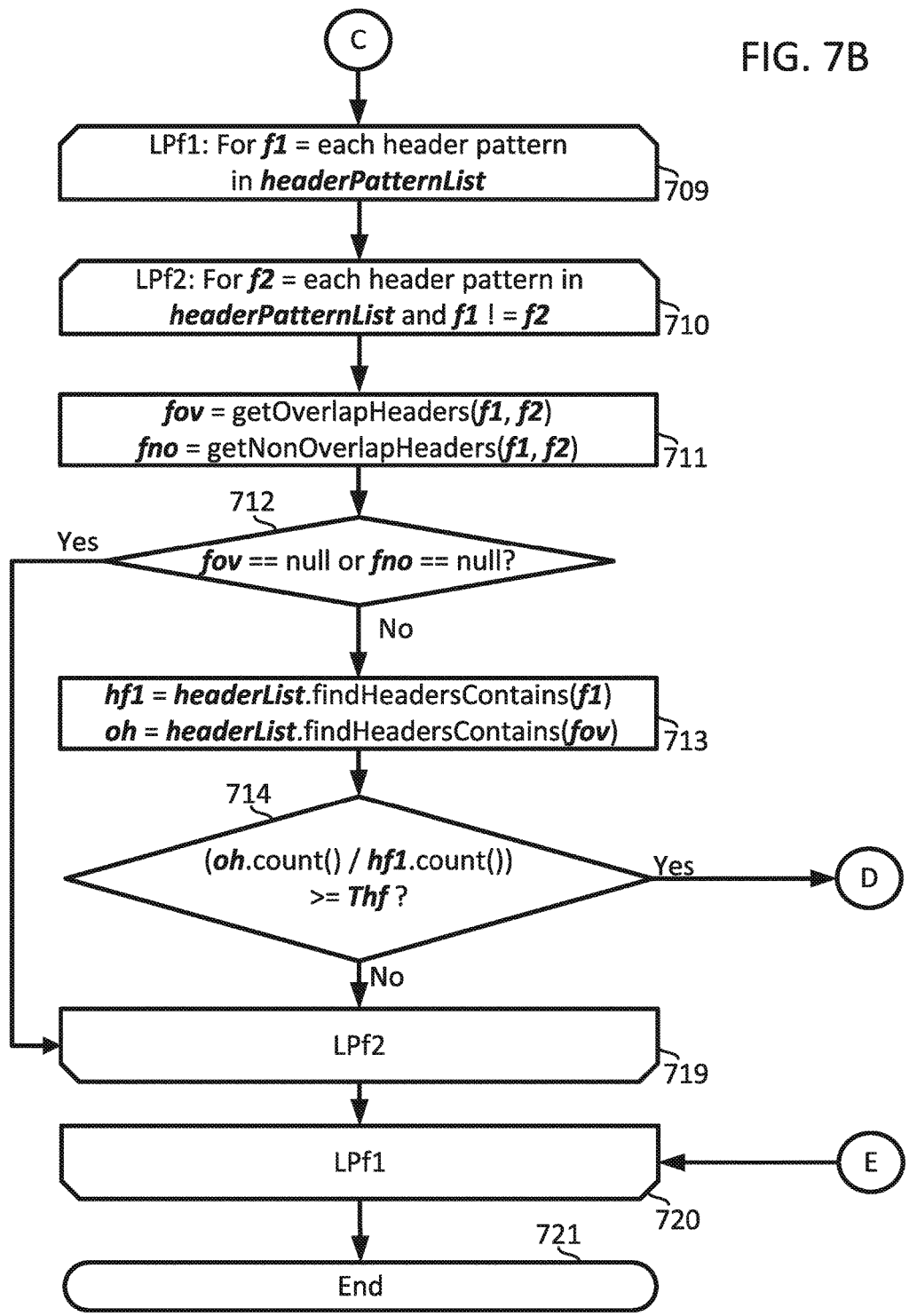
Figure 7C:
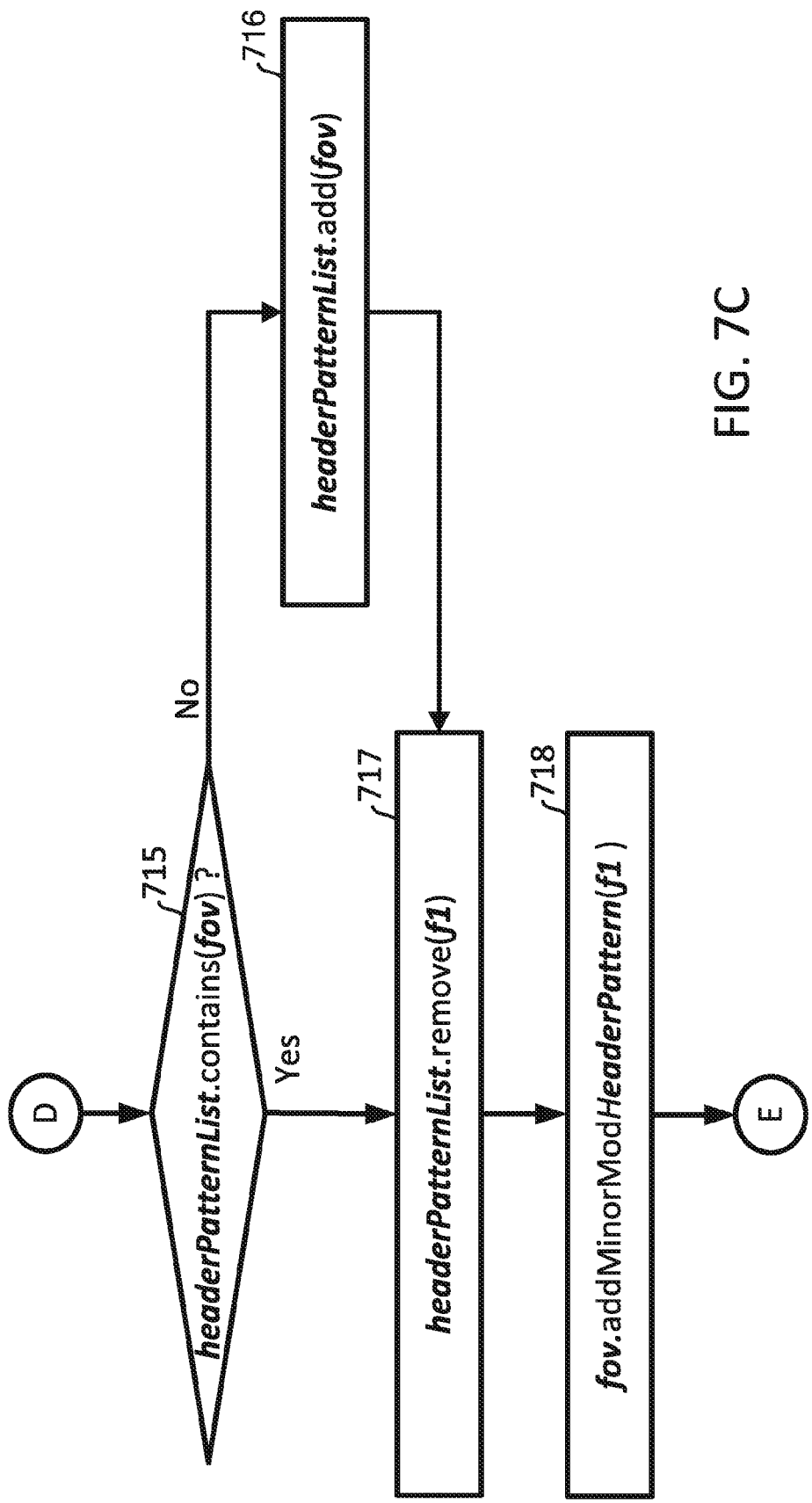

With reference now to FIGS. 7A to 7C, FIGS. 7A to 7C illustrate an embodiment of a detailed flowchart of step 206 described in FIG. 2A.

In step 701, the system starts the process of the step 206 described in FIG. 2A.

In step 702, the system prepares a variable, "headerPatternList", in the memory and then initializes the variable by zero. The variable, "headerPatternList", is a memory place where a list of one or more pairs of header patterns is stored.

In step 703, the system prepares "LPs", where "s" denotes each sheet in the repository.

In step 704, the system collects, from "headerList" and the sheet "s", a header candidate(s) which exist(s) in sheet "s" by hdrListInSheet=headerPatternList.findHeaderInSheet(s), where a variable, "hdrListInSheet" is a memory place where a list of header candidates which exist in the sheet "s", In step 705, the system judges whether "headerPatternList" contains "hdrListInSheet" or not. If the judgment is positive, the system proceeds to step 707. Meanwhile, if the judgment is negative, the system proceeds to step 706.

In step 706, the system adds "hdrListInSheet" to "headerPatternList".

In an optional step 707, the system sets, as a header pattern ID, an index of variable, "headerPatternList", to "s.headerPatternID" by "s.headerPatternID=headerPatternList.indexOf(hdrListInSheet)". Accordingly, information on a header pattern which was detected to the sheet "s" is set as the header pattern ID.

In step 708, the system repeats the steps 703 to 707 until unprocessed sheet(s) is (are) processed.

In step 709, the system prepares "LPf1": where "f1" denotes each header pattern in "headerPatternList".

In step 710, the system prepares "LPf2", where "f2" denotes each header pattern in "headerPatternList" and f1!=f2.

In step 711, the system sets "fov" to "getOverlapHeaders(f1, f2)" and "fno" to g"etNonOverlapHeaders(f1, f2)".

In step 712, the system judges whether fov==null or fno==null or not, where fov==null denotes that there is no overlapping between "f1" and "f2" and fno==null denotes that "f1" is completely the same as "f2". If the judgment is positive, the system proceeds to step 721. Meanwhile, if the judgment is negative, the system proceeds to step 713.

In step 713, the system sets "hf1" to "headerList.findHeadersContains(f1)" and "oh" to "headerList.findHeadersContains(fon)".

In step 714, the system calculates an overlapping rate by (oh.count( )/hf1.count( )) where the overlapping rate is used to find out overlapping relation of headers between or among the header patterns. The system then judges whether (oh.count( )/hf1.count( )) is equal to or larger than a predetermined number or not. If the judgment is positive, the system proceeds to step 715. Meanwhile, if the judgment is negative, the system proceeds to step 719.

In step 715, the system judges whether "headerPatternList" contains "fov" or not. If the judgment is positive, the system proceeds to step 716. Meanwhile, if the judgment is negative, the system proceeds to step 717.

In step 716, the system adds "fov" to "headerPatternList".

In step 717, the system removes "f1" from "headerPatternList".

In step 718, the system adds fov to MinorModHeaderPattern (f1).

In step 719, the system repeats the steps 710 to 718 until unprocessed header pattern(s) in "headerPatternList" is(are) processed.

In step 720, the system repeats the steps 709 to 719 until unprocessed header pattern(s) in "headerPatternList" is(are) processed.

In step 721, the system terminates the process of the step 206.

With reference now to FIGS. 8A to 8D, FIGS. 8A to 8D illustrate an embodiment of generating classification data which is used for classifying documents, according to an embodiment of the overall flowchart described in FIG. 2A.

Figure 8A:
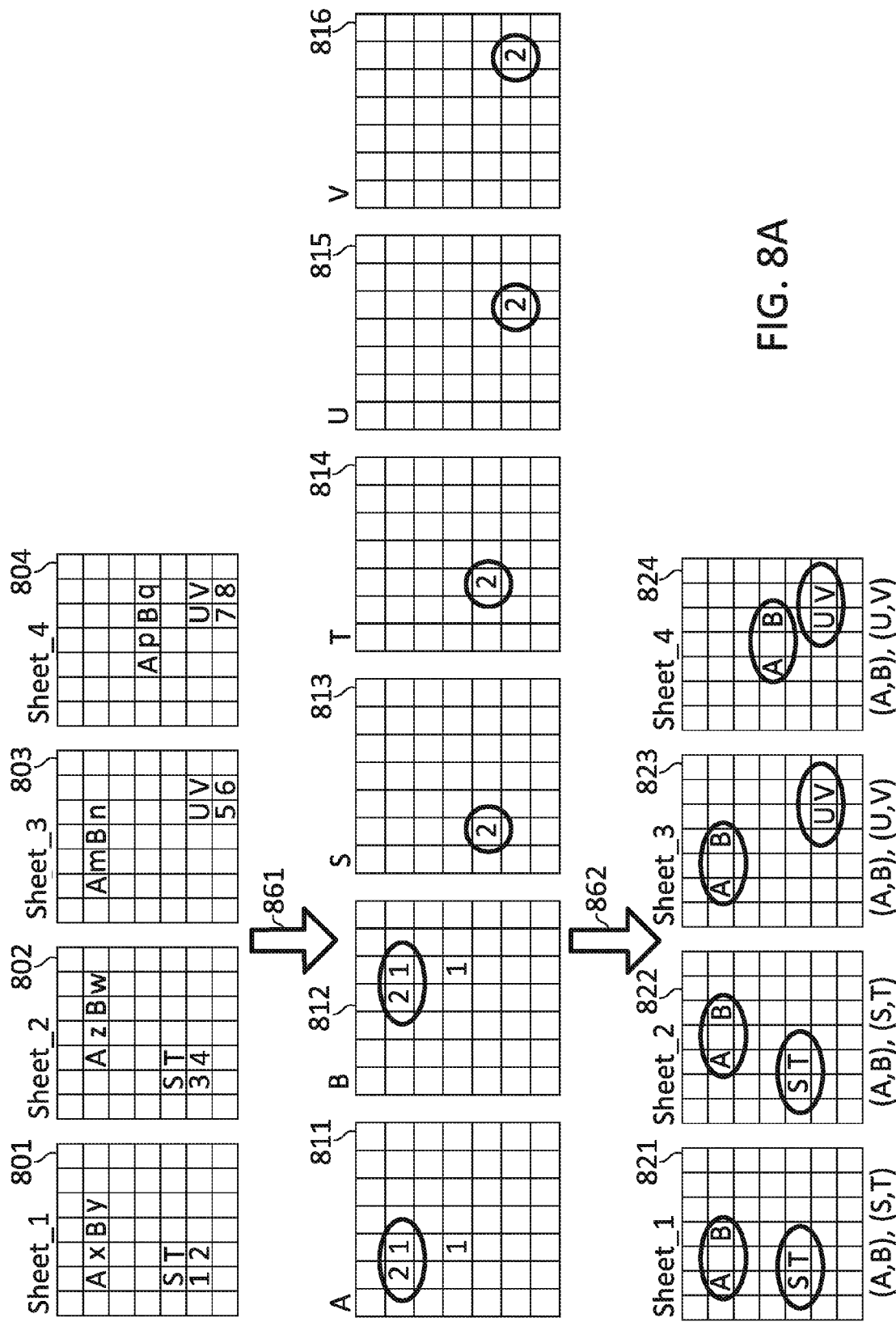
FIGS. 8A to 8D illustrate an embodiment of generating classification data which is used for classifying documents, according to an embodiment of the overall flowchart described in FIG. 2A, according to an embodiment of the present principles.

Let us suppose that a file having four sheets is provided, as illustrated in FIG. 8A. The four sheets are Sheet_1 (801), Sheet_2 (802), Sheet_3 (803) and Sheet_4 (804).

Each of the four sheets (801, 802, 803 and 804) has cell values as follows.

Sheet_1 (801) has cell value "A" at cell location B2, "B" at D2, "S" at B5, "T" at C5, "x" at C2, "y" at E2, "1" at B6 and "2" at C6.

Sheet_2 (802) has cell value "A" at cell location C2, "B" at E2, "S" at B5, "T" at C5, "z" at D2, "w" at F2, "3" at B6 and "4" at C6.

Sheet_3 (803) has cell value "A" at cell location B2, "B" at D2, "U" at E6, "V" at F6, "m" at C2, "n" at E2, "5" at E7 and "6" at F7.

Sheet_4 (804) has cell value "A" in cell location C4, "B" at E4, "U" at E6, "V" at F6, "p" at D4, "q" at F4, "7" at E7 and "8" at F7.

First, the system reads the file from a storage, such as the storage (291) described in FIG. 2A and then stores them in a memory. After then, the system collects cell values in each of the four sheets (801, 802, 803 and 804) and then stores the collected cell values in a repository, such as the repository (292) described in FIG. 2A.

In step 861, the system finds, in each of common or near cell locations among all sheets (801, 802, 803 and 804), one or more common cell values among the collected values stored in the repository. The system counts, for each of the common cell values, the number of the sheets having the common cell value.

Let us suppose that the predetermined number for storing the common cell value as a candidate header label is set to two.

The results of each count are as follows.

The cell value "A" appears four times at cell location B2 in Sheets_1 and_3 (801 and 803), C2 in Sheet_2 (802) and C4 in Sheet_4 (804). The system counts the number of cell value "A" which appears common or near cell locations, i.e. B2 and C2, among all sheets (801, 802, 803 and 804). The results of the counts are shown in the sheet for the cell value A (811). The counted number is three and, therefore, the number is larger than the predetermined number, two. Accordingly, the system stores the cell value "A" as a candidate header label. Please note that the cell value "A" at cell location C4 on Sheet_4 (804) is not counted, because the cell location C4 is neither common nor near cell location, i.e. B2 or C2.

The cell value "B" appears four times at cell location D2 in Sheets_1 and_3 (801 and 803), E2 in Sheet_2 (802) and E4 in Sheet_4 (804). As seen in the sheet for the cell value "B" (812), the system counts the number of cell value "B" which appears common or near cell locations, i.e. D2 and E2, among all sheets (801, 802, 803 and 804). The results of the counts are shown in the sheet for the cell value B (812). The counted number is three and, therefore, the number is larger than the predetermined number, two. Accordingly, the system stores the cell value "B" as a candidate header label. Please note that the cell value "B" at cell location E4 on Sheet_4 (804) is not counted, because the cell location C4 is neither common nor near cell location, i.e. B2 or C2.

The cell value "S" appears twice at cell location B5 in the Sheets_1 and_2 (801 and 802). The system counts the number of cell value "S" which appears common or near cell locations, i.e. B5, among all sheets (801, 802, 803 and 804). The results of the counts are shown in the sheet for the cell value S (813). The counted number is two and, therefore, the number is equal to the predetermined number, two. Accordingly, the system stores the cell value "S" as a candidate header label.

The cell value "T" appears twice at cell location C5 in Sheets_1 and_2 (801 and 802). The system counts the number of cell value "T" which appears common or near cell locations, i.e. C5, among all sheets (801, 802, 803 and 804). The results of the counts are shown in the sheet for the cell value T (814). The counted number is two and, therefore, the number is equal to the predetermined number, two. Accordingly, the system stores the cell value "T" as a candidate header label.

The cell value "U" appears twice at cell location E6 in Sheets_3 and_4 (803 and 804). The system counts the number of cell value "U" which appears common or near cell locations, i.e. E6, among all sheets (801, 802, 803 and 804). The results of the counts are shown in the sheet for the cell value U (815). The counted number is two and, therefore, the number is equal to the predetermined number, two. Accordingly, the system stores the cell value "U" as a candidate header label.

The cell value "V" appears twice at cell location F7 in Sheets_3 and_4 (803 and 804). The system counts the number of cell value "V" which appears common or near cell locations, i.e. F6, among all sheets (801, 802, 803 and 804). The results of the counts are shown in the sheet for the cell value V (816). The counted number is two and, therefore, the number is equal to the predetermined number, two. Accordingly, the system stores the cell value "V" as a candidate header label.

Each of the cell values "x", "y", "1" and "2" appears only once in Sheet_1 (801). The system counts the number of each of these cell values. However, the counted number is one. Accordingly, each of these cell values is not stored as a candidate header label.

Each of the cell values "z", "w", "3" and "4" appears only once in Sheet_2 (802). The system counts the number of each of these cell values. However, the counted number is one. Accordingly, each of these cell values is not stored as a candidate header label.

Each of the cell values "m", "n", "5" and "6" appears only once in Sheet_3 (803). The system counts the number of each of these cell values. However, the counted number is one. Accordingly, each of these cell values is not stored as a candidate header label.

Each of the cell values "p", "q", "7" and "8" appears only once in Sheet_4 (804). The system counts the number of each of these cell values. However, the counted number is one. Accordingly, each of these cell values is not stored as a candidate header label.

Accordingly, the cell values, "A", "B", "S" and "T", are stored as the candidate header labels.

In step 862, the system calculates a distance between cell locations of the candidate header labels in each of Sheets_1 to _4 (801, 802, 803 and 804).

For Sheet_1 (821), the system calculates each distance between the cell location of the candidate header labels, "A", "B", "S" and "T". The system chooses, with closeness of the calculated distance, candidate header labels among the candidate header labels, "A", "B", "S" and "T". One combination of the chosen candidate header labels, header, is (A, B), because the candidate header labels, "A" and "B" are located in the neighborhood. Another combination of the chosen candidate header labels, header, is (S, T), because the candidate header labels, "S" and "T" are located in the neighborhood.

For Sheet_2 (822), the system calculates each distance between the cell location of the candidate header labels, "A", "B", "S" and "T". The system chooses, with closeness of the calculated distance, candidate header labels among the candidate header labels, "A", "B", "S" and "T". One combination of the chosen candidate header labels, header, is (A, B), because the candidate header labels, "A" and "B" are located in the neighborhood. Another combination of the chosen candidate header labels, header, is (S, T), because the candidate header labels, "S" and "T" are located in the neighborhood.

For Sheet_3 (823), the system calculates each distance between the cell location of the candidate header labels, "A", "B", "U" and "V". The system chooses, with closeness of the calculated distance, candidate header labels among the candidate header labels, "A", "B", "U" and "V". One combination of the chosen candidate header labels, header, is (A, B), because the candidate header labels, "A" and "B" are located in the neighborhood. Another combination of the chosen candidate header labels, header, is (U, V), because the candidate header labels, "U" and "V" are located in the neighborhood.

For Sheet_4 (824), the system calculates each distance between the cell location of the candidate header labels, "A", "B", "U" and "V". The system chooses, with closeness of the calculated distance, candidate header labels among the candidate header labels, "A", "B", "U" and "V". One combination of the chosen candidate header labels, header, is (A, B), because the candidate header labels, "A" and "B" are located in the neighborhood. Another combination of the chosen candidate header labels, header, is (U, V), because the candidate header labels, "U" and "V" are located in the neighborhood.

Accordingly, three headers, (A, B), (S, T) and (U, V), are stored as classification data in a storage.

Please note that the cell values "A" and "B" at cell locations C4 and E4, respectively, in Sheet_4 (804) are not found as candidate header labels in step 861. However, the cell values "A" and "B" at cell locations C4 and E4, respectively, in Sheet_4 (804) are successfully found as a header in step 862.

Figure 8B:
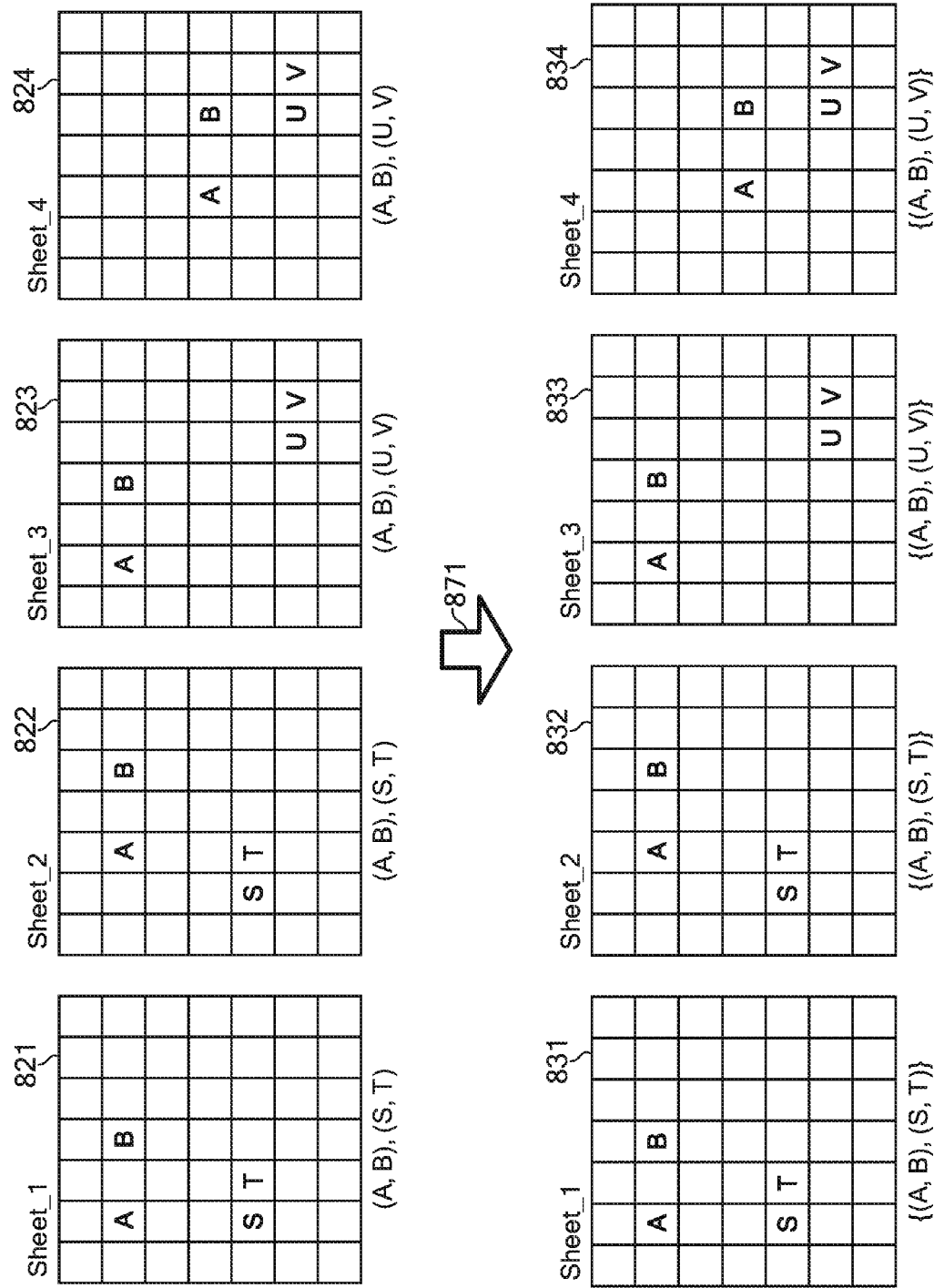
Figure 8C:
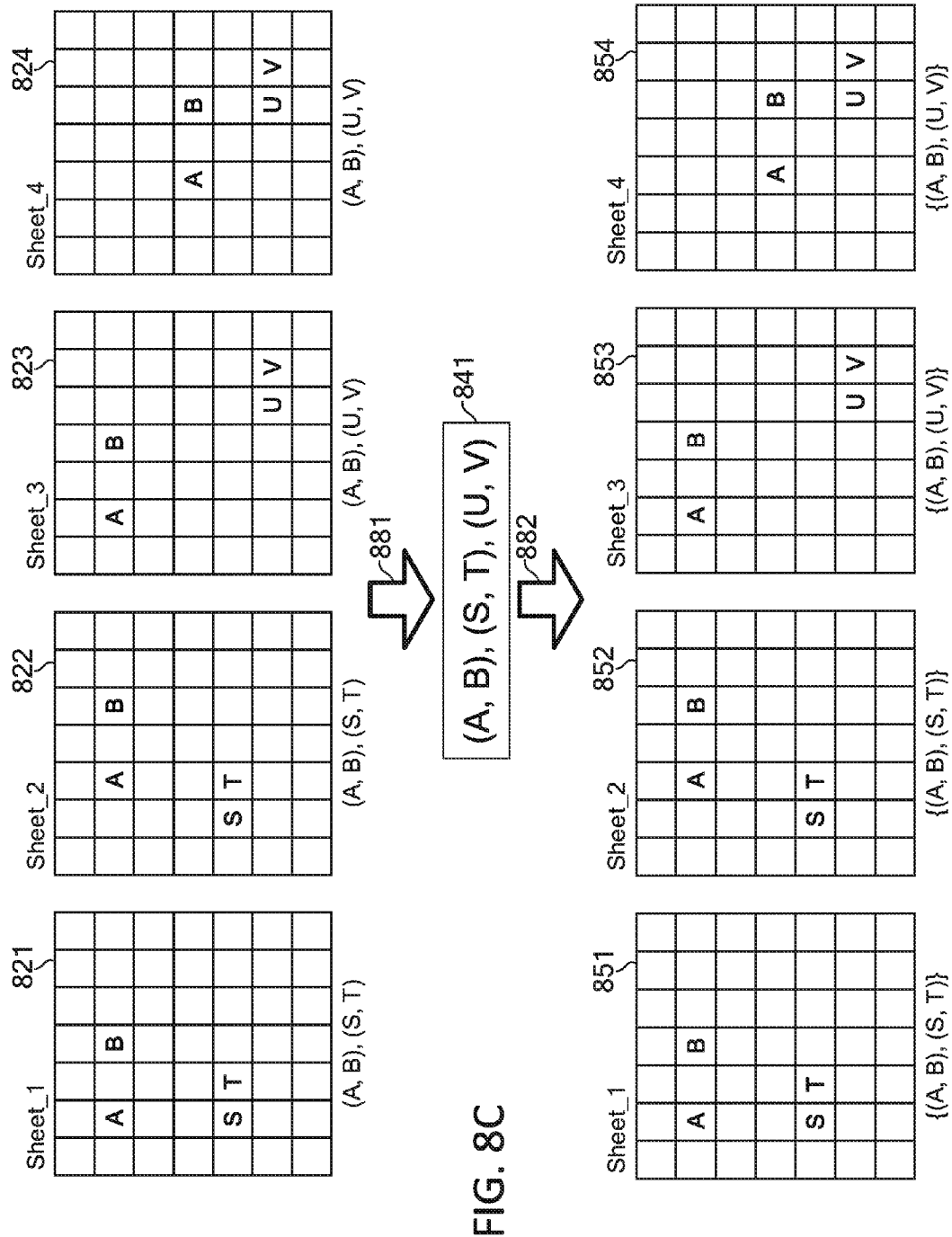
Figure 8D:
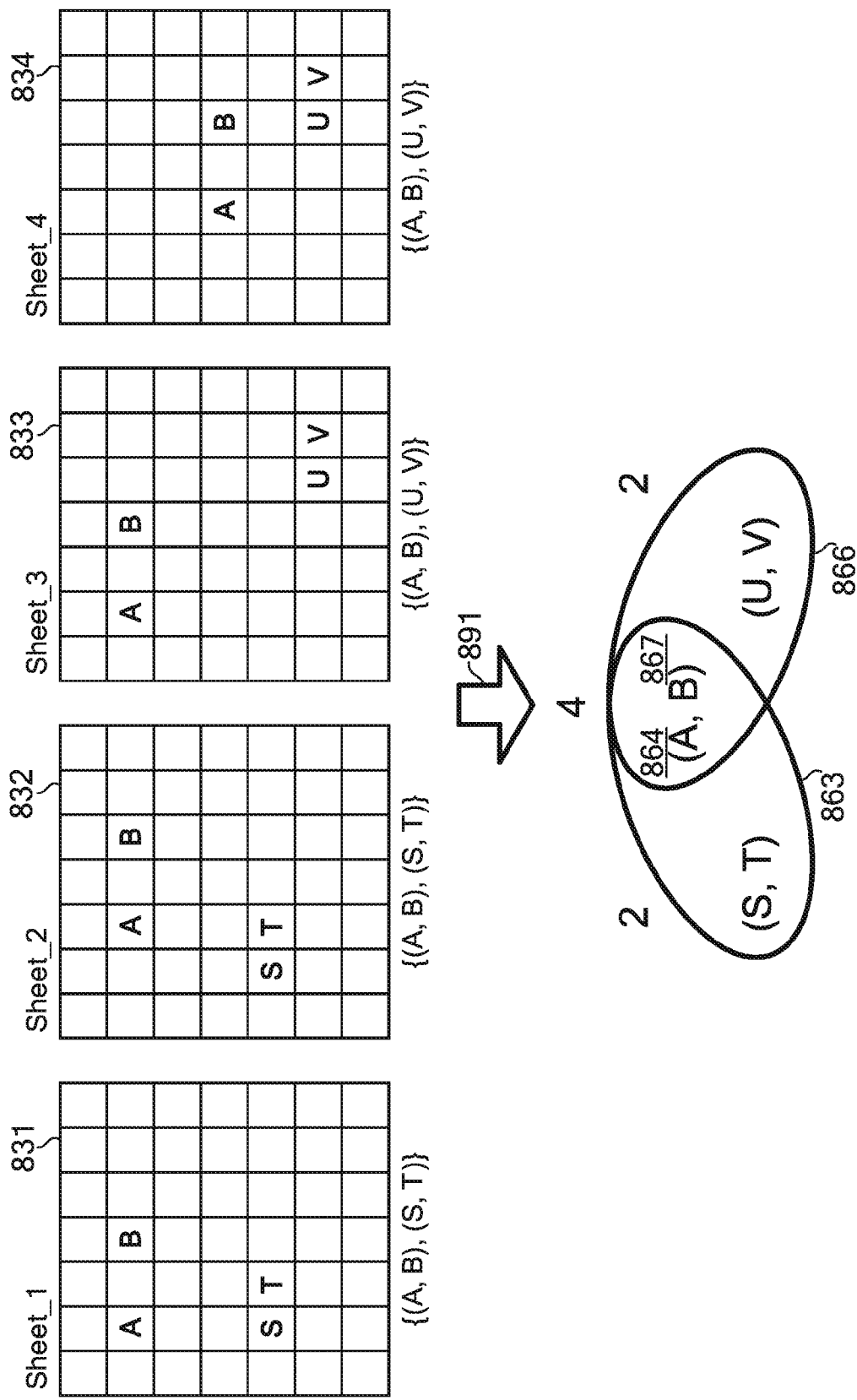

After step 862, the system may optionally proceed to step 871 described in FIG. 8B or step 881 described in FIG. 8C.

In step 871, the system calculates similarity between or among the headers and then chooses, based on the similarity, two or more headers among the headers in each of Sheets_1 to _4 (801, 802, 803 and 804). The similarity can be calculated with, for example, but not limited to, cosign similarity or edit distance.

For Sheet_1 (821), the system chooses, based on the similarity, headers (A, B) and (S, T) among the headers, (A, B), (S, T) and (U, V). Accordingly, a combination of the chosen headers, header pattern, is {(A, B), (S, T)} (831).

For Sheet_2 (822), the system chooses, based on the similarity, headers (A, B) and (S, T) among the headers, (A, B), (S, T) and (U, V). Accordingly, a combination of the chosen headers, header pattern, is {(A, B), (S, T)} (832).

For Sheet_3 (823), the system chooses, based on the similarity, headers (A, B) and (U, V) among the headers, (A, B), (S, T) and (U, V). Accordingly, a combination of the chosen headers, header pattern, is {(A, B), (U, V)} (833).

For Sheet_4 (824), the system chooses, based on the similarity, headers (A, B) and (U, V) among the headers, (A, B), (S, T) and (U, V). Accordingly, a combination of the chosen headers, header pattern, is {(A, B), (U, V)} (834).

Accordingly, two header patterns, {(A, B), (S, T)} and {(A, B), (U, V)}, are stored as new classification data to replace the classification data in a storage.

In step 881, the system counts, for each of the header, the number of the sheets having cell values corresponding to the header and, if the number of the documents is equal to or larger than a predetermined number, replaces the classification data with the header. Let us suppose that the predetermined number is two.

The header "(A, B)" appears in the four sheets (821, 822, 823 and 824). The number of sheets is four and, therefore, the number is larger than the predetermined number, two.

The header "(S, T)" appears in two sheets (821 and 822). The number of sheets is two and, therefore, the number is equal to the predetermined number, two.

The header "(U, V)" appears in two sheets (823 and 824). The number of sheets is two and, therefore, the number is equal to the predetermined number, two.

Accordingly, the headers "(A, B)", "(S, T)" and "(U, V)" (841) may be stored as new classification data to replace the classification data in a storage, if the following step 882 is not performed.

In step 882, the system may calculates similarity between or among the headers obtained in step 881 and then chooses, based on the similarity, two or more headers among the headers in each of Sheets_1 to 4 (821, 822, 823 and 824).

For t Sheet_1 (821), the system chooses, based on the similarity, headers (A, B) and (S, T) among the headers, "(A, B)", "(S, T)" and "(U, V)" (841). Accordingly, a combination of the chosen headers, header pattern, is {(A, B), (S, T)} (851).

For Sheet_2 (822), the system chooses, based on the similarity, headers (A, B) and (S, T) among the headers, "(A, B)", "(S, T)" and "(U, V)" (841). Accordingly, a combination of the chosen headers, header pattern, is {(A, B), (S, T)} (852).

For Sheet_3 (823), the system chooses, based on the similarity, headers (A, B) and (U, V) among the headers, "(A, B)", "(S, T)" and "(U, V)" (841). Accordingly, a combination of the chosen headers, header pattern, is {(A, B), (U, V)} (853).

For Sheet_4 (824), the system chooses, based on the similarity, headers (A, B) and (U, V) among the headers, "(A, B)", "(S, T)" and "(U, V)" (841). Accordingly, a combination of the chosen headers, header pattern, is {(A, B), (U, V)} (854).

Accordingly, two header patterns, {(A, B), (S, T)} and {(A, B), (U, V)}, are stored as new classification data to replace the classification data in a storage.

After step 871 or 882, the system may optionally proceed to step 891.

In one embodiment of step 891, the system may find out an overlapping relation of headers between the header patterns, "{(A, B), (S, T)}" (863) and "{(A, B), (U, V)}" (866). The header patterns, "{(A, B), (S, T)}" (863) and "{(A, B), (U, V)}" (866) overlaps with the part, (A, B) (864, 867). Accordingly, the part, (A, B) (864, 867), is now set to new header pattern (also referred to as "major header pattern") and a header pattern having the part, {(A, B), (S, T)}" (863) and "{(A, B), (U, V)}" (866), is set to a derived header pattern.

The system may further calculate a ratio of the number of documents in which the major header pattern is comprised and the number of documents in which the derived header pattern is comprised; and if the ratio is equal to or larger than a predetermined value, replace the derived header pattern with the major header pattern.

The number of documents having the part, (A, B) (864, 867), is four and the number of documents having the header pattern {(A, B), (S, T)}" (863) is two. Therefore, a ratio of the number of documents having the (A, B) (864, 867) and the number of documents having the {(A, B), (S, T)}" (863) is 2 (=4/2). If a predetermined value is three, the calculated ratio is lower than the predetermined value and, therefore, the header pattern {(A, B), (S, T)}" (863) is set to a derived header pattern for the overlapping part (A, B) (864, 867). If a predetermined value is two, the calculated ratio is equal to the predetermined value and, therefore, the header pattern {(A, B), (S, T)}" (863) is considered to be a minor modification of the (A, B) (864, 867) and not a main header pattern. Therefore, the header pattern {(A, B), (S, T)}" (863) is removed and the header patterns (A, B) (864, 867) are effective. Accordingly, the documents having the header pattern {(A, B), (S, T)}" (863) is deemed to be the documents having the header pattern (A, B) (864, 867).

The number of documents having the part, (A, B) (864, 867), is four and the number of documents having the header pattern {(A, B), (U, V)}" (866) is two. Therefore, a ratio of the number of documents having the (A, B) (864, 867) and the number of documents having the {(A, B), (U, V)}" (866) is 2 (=4/2). If a predetermined value is three, the calculated ratio is lower than the predetermined value and, therefore, the header pattern {(A, B), (U, V)}" (866) is set to a derived header pattern for the overlapping part (A, B) (864, 867). If a predetermined value is two, the calculated ratio is equal to the predetermined value and, therefore, the header pattern {(A, B), (U, V)}" (866) is considered to be a minor modification of the (A, B) (864, 867) and not a main header pattern. Therefore, the header pattern {(A, B), (U, V)}" (866) is removed and the header patterns (A, B) (864, 867) are effective. Accordingly, the documents having the header pattern {(A, B), (U, V)}" (866) is deemed to be the documents having the header pattern (A, B) (864, 867).

As a result of the process of the step 891, it is possible to classify documents based on their header patterns for documents without any template samples, while forgiving a minor modification of their header patterns.

With reference now to FIG. 8E, FIG. 8E illustrates an embodiment of classifying documents with classification data which was generated in the embodiment described in FIGS. 8A to 8D.

The system reads, from a storage, the file having four sheets (801, 802, 803 and 804).

In step 892, the system reads the classification data from the storage (293) and then stores the classification data in a memory. After then, the system classifies each document, using the classification data, such as two header patterns, {(A, B), (S, T)} and {(A, B), (U, V).

The system may output a classification result for each of the target documents.

Header Pattern 1 corresponds to header patterns, {(A, B), (S, T)}. The result (868) shows that Sheet_1 (801) and Sheet_(802) are classified as Header Pattern 1.

Header Pattern 2 corresponds to header patterns, {(A, B), (U, V)}. The result (869) shows that Sheet_3 (803) and Sheet_4 (805) are classified as Header Pattern 2.

With reference now to FIG. 9, FIG. 9 illustrates an embodiment of an overall functional block diagram of a computer system hardware used in accordance with the embodiment of the overall flowchart described in FIG. 2A.

The system (901) may correspond to the computer (101) described in FIG. 1.

The system (901) comprises a reading section (911), a collecting section (912) and a section of generating classification data (913).

The section of generating classification data (913) comprises a section of finding candidate header labels (921) and a section of finding header (922). The section of generating classification data (913) may optionally comprise a counting section (923), a section of finding header patterns (924) or a combination of these. The section of generating classification data (913) may optionally have a section of calculating overlapping (925) if the section of generating classification data (913) comprises the section of finding header patterns (924).

The reading section (911) may read documents in a form of a spreadsheet from the storage (291) and then store the documents in a memory.

The reading section (911) may perform the former part of step 202 described in FIG. 2A and the step 302 described in FIG. 3.

The collecting section (912) may collect cell values in each of the documents and then store the cell values in a memory or storage (292).

The collecting section (912) may perform the latter part of step 202 described in FIG. 2A and the steps 303 to 309 described in FIG. 3.

The section of finding candidate header labels (921) may find, in each of common or near cell locations among all or a part of the documents, one or more common cell values among the collected values, count, for each of the common cell values, the number of the documents having the common cell value and, if the number of the documents is equal to or larger than a predetermined number, store the common cell value as a candidate header label in a memory.

The section of finding candidate header labels (921) may perform the step 203 described in FIG. 2A and the steps described in FIG. 4.

The section of finding header (922) may calculate a distance between cell locations of the candidate header labels in each of the document, choose, with closeness of the distance, two or more candidate header labels among the candidate header labels for each of the documents, and store one or more combinations of the chosen two or more candidate header labels, i.e. header, as the classification data in a storage.

The section of finding header (922) may perform the step 204 described in FIG. 2A and the steps 502 to 514 and 518 described in FIGS. 5A and 5B.

The counting section (923) may count, for each of the header, the number of the documents having cell values corresponding to the header and, if the number of the documents is equal to or larger than a predetermined number, replace the classification data with the header.

The counting section (923) may count, for each of the headers, the number of the documents having cell values corresponding to the header; if the number of the documents is equal to or larger than a predetermined number.

The counting section (923) may perform the steps 411 and 412 described in FIG. 4 and the steps 515 to 516 described in FIG. 5B.

The section of finding header patterns (924) may calculate similarity between or among the headers, choose, based on the similarity, two or more headers among the headers in each of the documents, and replace the classification data with a combination of the chosen two or more headers.

The section of finding header patterns (924) may choose one or more headers; if the chosen header is plural in each of the documents, calculate similarity between or among the headers; choosing, based on the similarity, two or more headers among the plural headers; and replace the classification data with a combination of the chosen two or more headers.

The section of finding header patterns (924) may perform the step 205 described in FIG. 2A and the steps described in FIG. 6.

The section of calculating overlapping (925) may find out an overlapping relation of headers between or among the header patterns. After finding out the overlapping relation, a part having the overlapping relation is set to new header pattern, "a major header pattern", and a header pattern having the part is set to a derived header pattern for the major header part.

The section of calculating overlapping (925) may further calculate a ratio of the number of documents in which the major header pattern is comprised and the number of documents in which the derived header pattern is comprised; and if the ratio is equal to or larger than a predetermined value, replace the derived header pattern with the major header pattern.

The section of calculating overlapping (925) may perform the step 206 described in FIG. 2A and the steps described in FIGS. 7A to 7C.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transparent media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transparent cables, optical transparent fibers, wireless transparent, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A computer-implemented method for generating classification data which is used for classifying documents, the method comprising:
    reading, in a memory, documents in a form of a spreadsheet;
    collecting cell values in each of the documents;
    finding, using a processor, in each of common or near cell locations among all or a part of the documents, one or more common cell values among the collected values;
    counting, using the processor, for each of the common cell values, a number of the documents having the common cell value;
    storing, if the number of the documents is equal to or larger than a predetermined number, the common cell value as a candidate header label in a memory;
    calculating, using the processor, a distance between cell locations of the candidate header labels in each of the documents;
    choosing, according to the calculated distance, two or more candidate header labels among the candidate header labels for each of the documents; and
    storing, in a storage, one or more combinations of the chosen two or more candidate header labels (hereinafter referred to as "header") as the classification data.

2. The method as recited in claim 1, further comprising:
    counting, for each of the header, the number of the documents having cell values corresponding to the header; and
    if the number of the documents is equal to or larger than a predetermined number, replacing the classification data with the header.

3. The method as recited in claim 1, further comprising:
    calculating a similarity between or among the headers;
    choosing, based on the similarity, two or more headers among the headers in each of the documents; and
    replacing the classification data with a combination of the chosen two or more headers (hereinafter referred to as "header pattern").

4. The method as recited in claim 3, wherein the choice of the two or more candidate header labels is carried out if the similarity is equal to or larger than a predetermined value.

5. The method as recited in claim 3, wherein the similarity is calculated with cosign similarity or edit distance.

6. The method as recited in claim 3, further comprising:
    finding out an overlapping relation of headers between or among the header patterns;
    setting, after finding out the overlapping relation, a part having the overlapping relation is to a new header pattern (hereinafter referred to as "a major header pattern"); and
    setting, after finding out the overlapping relation, a header pattern having the part to a derived header pattern for the major header part.

7. The method as recited in claim 6, further comprising:
    calculating a ratio of the number of documents in which the major header pattern is comprised and the number of documents in which the derived header pattern is comprised; and
    if the ratio is equal to or larger than a predetermined value, replacing the derived header pattern with the major header pattern.

8. The method as recited in claim 1, further comprising:
    counting, for each of the headers, the number of the documents having cell values corresponding to the header;
    if the number of the documents is equal to or larger than a predetermined number, choosing one or more candidate header labels;
    if the number of chosen headers is plural in each of the documents, calculating similarity between or among the headers;
    choosing, based on the similarity, two or more headers among the plural headers; and
    replacing the classification data with a combination of the chosen two or more headers.

9. The method as recited in claim 1, wherein the near cell locations are cell locations in a row, cell locations in a column, or cell locations in any row and column.

10. The method as recited in claim 1, wherein the distance between cell locations is a distance between cells in a row, a distance between cells in a column, or a distance between cells in any row and column.

11. A system for generating classification data which is used for classifying documents, comprising:
a memory; and
a processor configured to:
  read, in the memory, documents in a form of a spreadsheet and collecting cell values in each of the documents;
  find, in each of common or near cell locations among all or a part of the documents, one or more common cell values among the collected values;
  count, for each of the common cell values, the number of the documents having the common cell value;
  store, if the number of the documents is equal to or larger than a predetermined number, the common cell value as a candidate header label in a memory;
  calculate a distance between cell locations of the candidate header labels in each of the document;
  choose, according to the calculated distance, two or more candidate header labels among the candidate header labels for each of the documents; and
  store one or more combinations of the chosen two or more candidate header labels (hereinafter referred to as "header") as the classification data in a storage.

12. The system as recited in claim 11, the processor being further configured to:
  count, for each of the headers, the number of the documents having cell values corresponding to the header; and
  replace, if the number of the documents is equal to or larger than a predetermined number, the classification data with the header.

13. The system as recited in claim 11, the processor being further configured to:
  calculate a similarity between or among the headers;
  choose, based on the similarity, two or more headers among the headers in each of the documents; and
  replace the classification data with a combination of the chosen two or more headers.

14. The system as recited in claim 11, the processor being further configured to:
  count, for each of the headers, the number of the documents having cell values corresponding to the header;
  choose, if the number of the documents is equal to or larger than a predetermined number, one or more headers;
  calculate, if the number of chosen headers is plural in each of the documents, a similarity between or among the headers;
  choose, based on the similarity, two or more headers among the plural headers; and
  replace the classification data with a combination of the chosen two or more headers.

15. A non-transitory computer readable storage medium comprising a computer readable program for generating classification data which is used for classifying documents, wherein the computer readable program when executed on a computer causes the computer to perform the steps of:
  reading, in a memory, documents in a form of a spreadsheet and collecting cell values in each of the documents;
  finding, in each of common or near cell locations among all or a part of the documents, one or more common cell values among the collected values;
  counting, for each of the common cell values, a number of the documents having the common cell value;
  storing, if the number of the documents is equal to or larger than a predetermined number, the common cell value as a candidate header label in a memory;
  calculating a distance between cell locations of the candidate header labels in each of the document;
  choosing, according to the calculated distance, two or more candidate header labels among the candidate header labels for each of the documents; and
  storing one or more combinations of the chosen two or more candidate header labels (hereinafter referred to as "header") as the classification data in a storage.

16. The non-transitory computer readable storage medium as recited in claim 15 wherein the computer readable program when executed on the computer causes the computer to further perform the steps of:
  counting, for each of the headers, the number of the documents having cell values corresponding to the header; and
  replacing, if the number of the documents is equal to or larger than a predetermined number, the classification data with the header.

17. The non-transitory computer readable storage medium as recited in claim 15, wherein the computer readable program when executed on the computer causes the computer to further perform the steps of:
  calculating similarity between or among the headers;
  choosing, based on the similarity, two or more headers among the headers in each of the documents; and
  replacing the classification data with a combination of the chosen two or more headers (hereinafter referred to as "header pattern").

18. The non-transitory computer readable storage medium as recited in claim 17, wherein the computer readable program when executed on the computer causes the computer to further perform the steps of:
  finding out an overlapping relation of headers between or among the header patterns;
  setting, after finding out the overlapping relation, a part having the overlapping relation is to a new header pattern (hereinafter referred to as "a major header pattern"); and
  setting, after finding out the overlapping relation, a header pattern having the part to a derived header pattern for the major header part.

19. The non-transitory computer readable storage medium as recited in claim 18, wherein the computer readable program when executed on the computer causes the computer to further perform the steps of:
  calculating a ratio of the number of documents in which the major header pattern is comprised and the number of documents in which the derived header pattern is comprised; and
  replacing, if the ratio is equal to or larger than a predetermined value, the derived header pattern with the major header pattern.

20. The non-transitory computer readable storage medium as recited in claim 15, wherein the computer readable program when executed on the computer causes the computer to further perform the steps of:
  counting, for each of the headers, the number of the documents having cell values corresponding to the header;
  choosing, if the number of the documents is equal to or larger than a predetermined number, one or more headers;

calculating, if the number of chosen headers is plural in each of the documents, a similarity between or among the headers;
choosing, based on the similarity, two or more headers among the plural headers; and
replacing the classification data with a combination of the chosen two or more headers.

\* \* \* \* \*